United States Patent [19]

Cross

[11] Patent Number: 5,153,839
[45] Date of Patent: Oct. 6, 1992

[54] WIRE HARNESS MANUFACTURING SYSTEM

[75] Inventor: Dan A. Cross, Seattle, Wash.

[73] Assignee: The Boeing Company, Seattle, Wash.

[21] Appl. No.: 590,650

[22] Filed: Sep. 28, 1990

[51] Int. Cl.⁵ .................. G06F 15/46; H01R 43/00
[52] U.S. Cl. .................. 364/468; 29/33 M; 29/564.1; 29/755; 364/474.11
[58] Field of Search ........... 364/468, 474.01, 474.11, 364/474.24, 130, 131–134; 29/563, 564, 564.6, 564.1, 33 M, 33 F, 755, 742, 747, 748, 861, 868, 857; 140/93 R

[56] References Cited

U.S. PATENT DOCUMENTS

| | | |
|---|---|---|
| 3,766,624 | 10/1973 | Grebe et al. ............... 29/203 MW |
| 3,842,496 | 10/1974 | Mercer ........................... 29/624 |
| 3,881,374 | 5/1975 | Gudmestad ..................... 81/9.51 |
| 3,907,007 | 9/1975 | Hobbs et al. ................. 140/93 R |
| 3,930,524 | 1/1976 | Tarbox .......................... 140/93 R |
| 4,030,527 | 6/1977 | Roch ............................. 140/92.1 |
| 4,033,386 | 7/1977 | Wood ............................ 140/92.1 |
| 4,043,034 | 8/1977 | Sucheski et al. ................ 29/749 |
| 4,190,890 | 2/1980 | Marx ............................. 364/491 |
| 4,380,117 | 4/1983 | Brandewie et al. ............. 29/742 |
| 4,433,479 | 2/1984 | Suzuki et al. .................. 29/825 |
| 4,520,966 | 6/1985 | Bloch et al. .................. 242/54 R |
| 4,593,452 | 6/1986 | Keahey et al. ................ 29/564.6 |
| 4,631,812 | 12/1986 | Young ........................... 29/714 |
| 4,638,558 | 1/1987 | Eaton ............................. 29/861 |
| 4,653,159 | 3/1987 | Henderson et al. .......... 29/33 M |
| 4,653,160 | 11/1983 | Thorkildsen et al. ......... 29/33 M |
| 4,677,734 | 7/1987 | Bloch et al. ................. 29/564.2 |
| 4,685,636 | 8/1987 | Eaton ............................. 242/129 |
| 4,701,007 | 10/1987 | Jonca ........................... 350/96.10 |
| 4,711,025 | 12/1987 | DeSanto ......................... 29/854 |
| 4,715,100 | 12/1987 | Cross ........................... 29/33 M |
| 4,718,167 | 1/1988 | Moore et al. ................... 29/861 |
| 4,729,152 | 3/1988 | Hammond et al. ............ 29/33 M |
| 4,796,194 | 1/1989 | Atherton ....................... 364/468 |
| 4,803,778 | 2/1989 | Cross ............................. 29/857 |
| 4,939,668 | 7/1990 | Brown et al. ............... 364/468 X |

Primary Examiner—Joseph Ruggiero
Attorney, Agent, or Firm—Joan H. Pauly

[57] ABSTRACT

The manufacturing system includes a wire segment preparation subsystem and a termination subsystem, each of which operates independently under the direction of local computer controllers. The preparation sybsystem measures and marks wire and cuts it into segments. The termination subsystem processes the ends of the wire segments. A transport subsystem selectively transports batches of wire segments from the preparation subsystem to the termination stations of the termination subsystem. A system controller oversees the operation of the system and transmits batches of computer process control data to the subsystems. The local controllers use the downloaded batches of data to direct the processing of batches of wire segments. The system may be entirely automated, or may include a mix of automated and manual work stations. The segments are preferably loaded in batches in carriers for transport between subsystems and work stations. The carriers may be transported by hand, along roller tables, and/or on conveyors. The subsystem work stations have input and output queues. The wire segments are hung on dividers in the carrier or are individually coiled onto reelettes which are in turn loaded in the carrier.

30 Claims, 19 Drawing Sheets

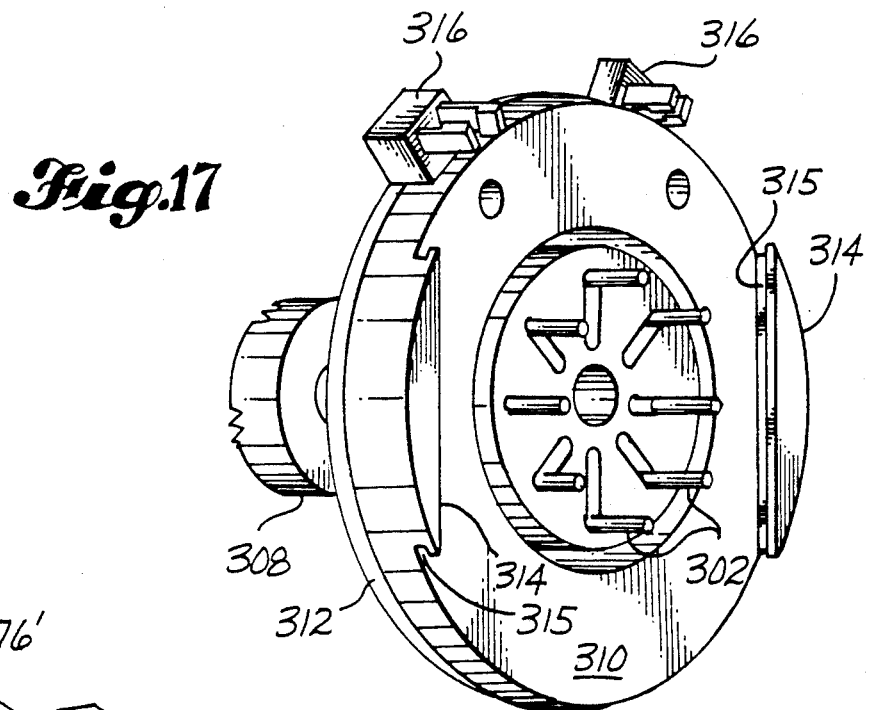
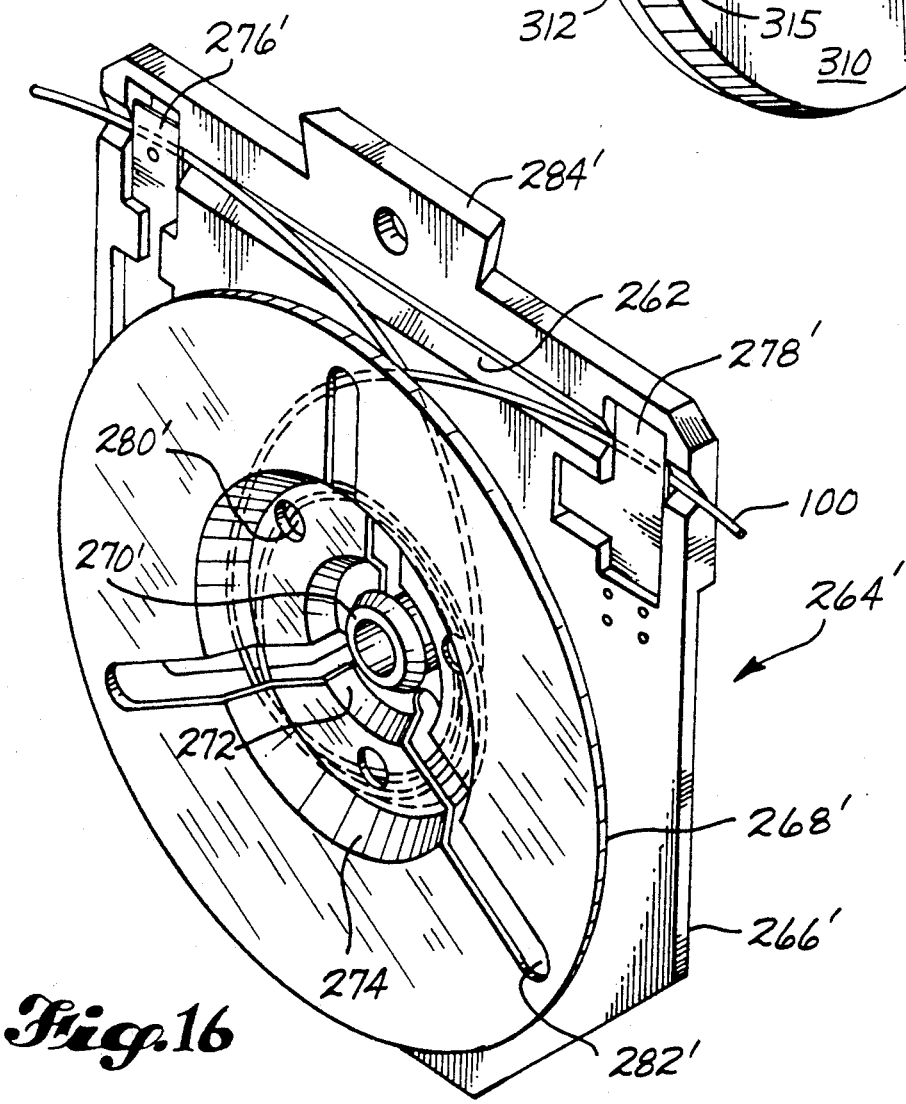

WIRE HARNESS MANUFACTURING SYSTEM

TECHNICAL FIELD

This invention relates to systems for manufacturing electrical wire harnesses and, more particularly, to such a system in which batches of control data are transferred from an information processing subsystem to a wire segment preparation subsystem and a plurality of autonomous wire segment termination stations, and batches of wire segments are selectively transported to the termination stations.

BACKGROUND INFORMATION

The wiring for the electrical systems of aircraft is conventionally assembled outside the aircraft into wire harnesses that include large numbers of wire segments having opposite ends leading to various connectors. The number of wire segments in a single harness can be as large as several hundred. The manufacture of a wire harness is complicated and difficult to automate and, thus, is generally highly labor intensive.

One approach to increasing the efficiency of the manufacture of wire harnesses is to automate the preparation of wire segments from a continuous source or sources and/or the processing of the wire segment ends. Known systems incorporating this approach have the problems of being relatively inflexible, retaining major inefficiencies, and being subject to frequent system shutdowns. One of the major reasons for these problems is that the individual wire segments are moved through the system and processed in a predetermined sequence. Thus, at any given point, the rate of movement of the segments through the system is governed by the segment end processing procedure or other procedure which has the longest completion time. In addition, such systems are vulnerable to total system shutdowns caused by a fault in any single one of a number of specific processing devices.

Systems for manufacturing electrical harnesses are disclosed in U.S. Pat. Nos. 3,766,624, granted Oct. 23, 1973, to R. K. Grebe et al.; 4,638,558, granted Jan. 27, 1987, to H. L. Eaton; 4,653,159, granted Mar. 31, 1987, to J. A. Henderson et al.; and 4,653,160, granted Mar. 31, 1987, to F. Thorkildsen et al. In the system disclosed in each of these patents, work stations are lined up along a conveyor. Individual wire segments are mounted on the conveyor which moves intermittently to allow the segments to be processed at the work stations. Wire harness manufacturing systems in which the wire ends are processed after the wire is laid out are disclosed in U.S. Pat. Nos. 3,842,496, granted Oct. 22, 1974, to P. W. Mercer; and 4,433,479, granted Feb. 28, 1984, to Y. Suzuki et al.

A system for manufacturing wire harnesses for aircraft in which the segments are moved sequentially through the system is disclosed in U.S. Pat. Nos. 4,520,966, granted Jun. 4, 1985, to J. T. Blooh and the present applicant; 4,677,734, granted Jul. 7, 1987, to the same inventors; and 4,803,778, system, individual wire segments are loaded into canisters and placed on a rotatable table. A robot swivels. to pick up a canister, swivels to an equipment rack on which a plurality of termination devices are mounted, and then deposits the canister with the processed segment in a bay of a queuing subsystem for the lay-up phase of the manufacture.

DISCLOSURE OF THE INVENTION

The present invention relates to an overall system for manufacturing aircraft wire harnesses. The system includes a plurality of subsystems, such as a wire segment transport subsystem and an automated termination subsystem. The details of the automated termination subsystem are the subject of a copending application of the applicant entitled "Automated Termination Station and Method of Using Same", Ser. No. 07/590,661 . An aspect of the transport subsystem is the subject of another copending application of the applicant entitled "Wire Carrier and Method of Using Same", Ser. No. 07/590,651 . In the early stages, of the development of the system, the applicant perceived that the manufacture of wire harnesses could be accomplished more efficiently by providing for information transfer, and processing and delivery of wire segments, in batches.

The present invention provides both apparatus and a method for manufacturing electrical wire harnesses. According to a basic apparatus aspect of the invention, the system comprises an information storage subsystem for storing computer process control data, a wire segment preparation subsystem for preparing batches of wire segments of predetermined lengths, and a termination subsystem. The termination subsystem includes a plurality of autonomous wire segment termination stations. The system also includes a communication subsystem to transfer the control data in batches to the segment preparation subsystem and the termination stations. A wire segment transport subsystem selectively transports batches of wire segments from the preparation subsystem to the termination stations. As used herein, the term "termination" refers to the processing of the ends of the wire segments. The term includes, but is not limited to, stripping insulation from the ends of the segments and installing electrical contacts and/or lugs on the ends.

The invention overcomes the problem of the difficulty in automating the manufacture of wire harnesses. The invention allows optimal automation of the manufacturing process while retaining a high degree of flexibility. The result is a level of efficiency that has previously been unobtainable using known manufacturing systems. Systems of the invention may include one or more of a number of preferred features that help to maximize the gains in efficiency. For example, in most installations, the termination stations preferably include at least one manual station and at least one automated station. This allows most of the termination functions to be automated in a cost effective manner, and the remaining termination functions, such as those that cannot be automated or are only rarely required, to be manually performed without interfering with the automated procedures.

The system of the invention is preferably a complete manufacturing system. For example, the information storage subsystem preferably is capable of accepting engineering harness data and converting it into computer process control data. The segment preparation subsystem preferably includes devices and apparatus for measuring and cutting wire from a continuous source into segments of predetermined lengths, and for marking the segments. The system of the invention may also include a lay-up subsystem to which batches of wire segments are transported from the termination stations and which receives control data in batches from the information processing subsystem.

The wire segment transport subsystem preferably includes a plurality of carriers in order to facilitate the transporting of wire segments in batches. Each of the carriers is dimensioned to receive a batch of wire segments. The segments are preferably loaded into the carrier in an organized manner that makes each individual segment readily accessible to a human or robotic operator. In a preferred embodiment, the carrier is dimensioned to receive a plurality of reels, each of which is adapted to receive a single wire segment wound thereon. The carriers may be transported manually or by an endless-belt type conveyor or other suitable means.

In embodiments that include an automated termination station, the automated station preferably includes queuing substations for incoming and outgoing carriers. When the carriers are delivered to the station by a conveyor, the queuing substations are preferably accessible to but independent of the conveyor. This permits queuing of the carriers at the termination station without obstructing the flow of carriers along the conveyor.

The communication subsystem preferably includes a shop supervisor. The shop supervisor receives status reports from the termination stations and makes data requests to the information storage subsystem. The supervisor may also control the routing of batches of wire segments to and from the termination stations and the routing of carriers to and between stations in the preparation subsystem. The routing is preferably revised, as necessary, during the manufacturing process to maintain efficiency.

The method of the invention basically comprises communicating computer process control data in batches to a wire segment preparation subsystem and a plurality of termination stations. In the preparation subsystem, the control data is used to independently control preparation of a batch of wire segments. This batch of wire segments is selectively transported to one of the termination stations. At the station, a batch of control data is used to independently control processing of end portions of the wire segments. The method may also include generating the computer process control data from engineering harness data.

The system of the invention is highly flexible. The use of a plurality of autonomous termination stations has the advantage of enabling an increase in the number of different processing devices that may be used in the manufacturing system without creating system-wide time delays or increasing the risk of total system shutdown. The capacity to accommodate a large number of different devices makes it possible to fabricate a wide variety of harnesses that include a wide variety of wire types and sizes. A plurality of termination stations also facilitates providing redundant processing devices to, thus, further enhance the reliability of the system. The number of termination stations and the particular processing devices installed in each such station can be chosen to match the productivity of the end processing subsystem to the productivity of the other subsystems. This avoids time delays in other subsystems caused by end processing times and, therefore, helps maximize the overall system efficiency. When the type of harness being manufactured is changed, it is generally a simple matter to change the processing device configurations in the termination stations, as necessary, to maintain the work completion rate of the termination subsystem.

In the preferred embodiments of the system, the wire segments in a particular batch may be processed in any order. Each batch of wire segments may be processed at a single termination station or a plurality of termination stations, and may be routed to a plurality of stations in any order. In each termination station, the wire segments in the batch may be processed in any order. This ability to randomly process the segments within a batch facilitates optimal use of the end processing equipment and substantially eliminates delays caused by failures in the termination subsystem. A batch of segments may be sent on to another termination station even though some individual segments have not been processed because of a fault in a processing device. The batch may subsequently be returned when the fault has been corrected. Alternatively, the batch may be sent to a station, if available, with a duplicate or equivalent processing device. When there is a failure at a station at which a batch of segments is scheduled to be processed, the batch may similarly be rerouted.

The system of the invention readily accommodates queuing of batches of segments at each subsystem and termination station. This, in combination with the relative autonomy of the system elements, helps to maximize system efficiency and reliability and to minimize the effect of failures in individual elements.

The advantages and features discussed above and additional advantages and features will become apparent from the detailed description of the best modes for carrying out the invention that follows.

BRIEF DESCRIPTION OF THE DRAWINGS

In the drawings, like element designations refer to like parts throughout, and:

FIG. 16 is a pictorial view of a first preferred embodiment of the reelette used in the system shown in FIGS. 14 and 15.

FIG. 17 is a pictorial view of part of the wire reeling mechanism of the preparation subsystem of the system illustrated in FIGS. 14 and 15.

BEST MODES FOR CARRYING OUT THE INVENTION

The drawings show two systems that are constructed according to the invention and that also constitute the best modes for carrying out the method and apparatus of the invention currently known to the applicant. The embodiment illustrated in FIGS. 1-13 is a complete system including all the elements necessary for manufacturing a wire harness from the input of engineering data to the completion of the harness. The system includes both automated and manual work stations which are integrated together into an overall system. The system illustrated in FIGS. 14-29 is a more highly automated system which has as its main components automated wire segment preparation work stations and automated wire segment termination work stations. This system does not include manual work stations or a lay up subsystem. Both of the illustrated embodiments are within the scope of the invention. The differences between the embodiments exemplify the wide range of possible variation of systems constructed in accordance with the invention.

Figure 1:
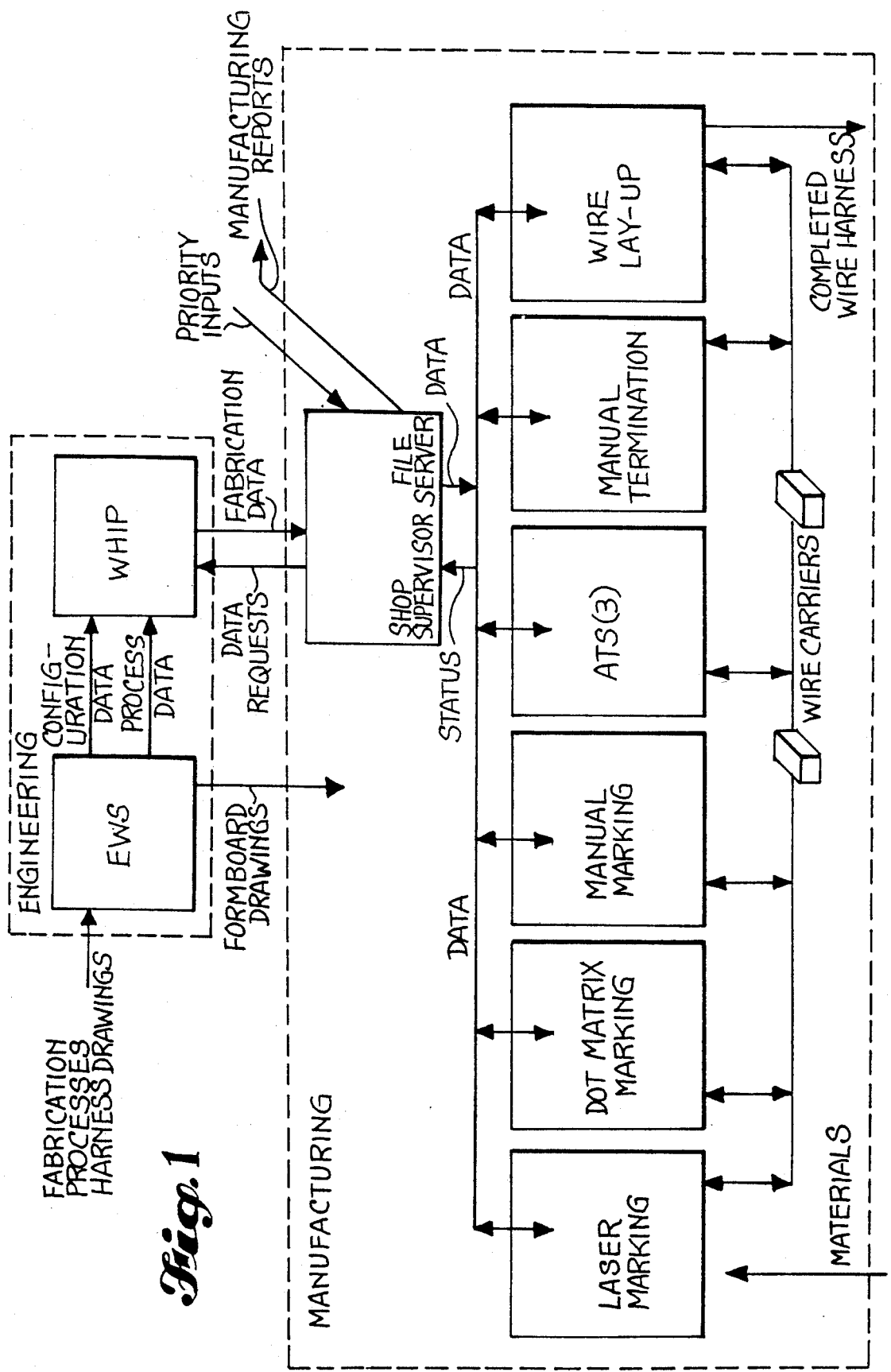
FIG. 1 is a schematic diagram of a first preferred embodiment of the system of the invention, illustrating the exchange of information and materials in the system.
Figure 2:
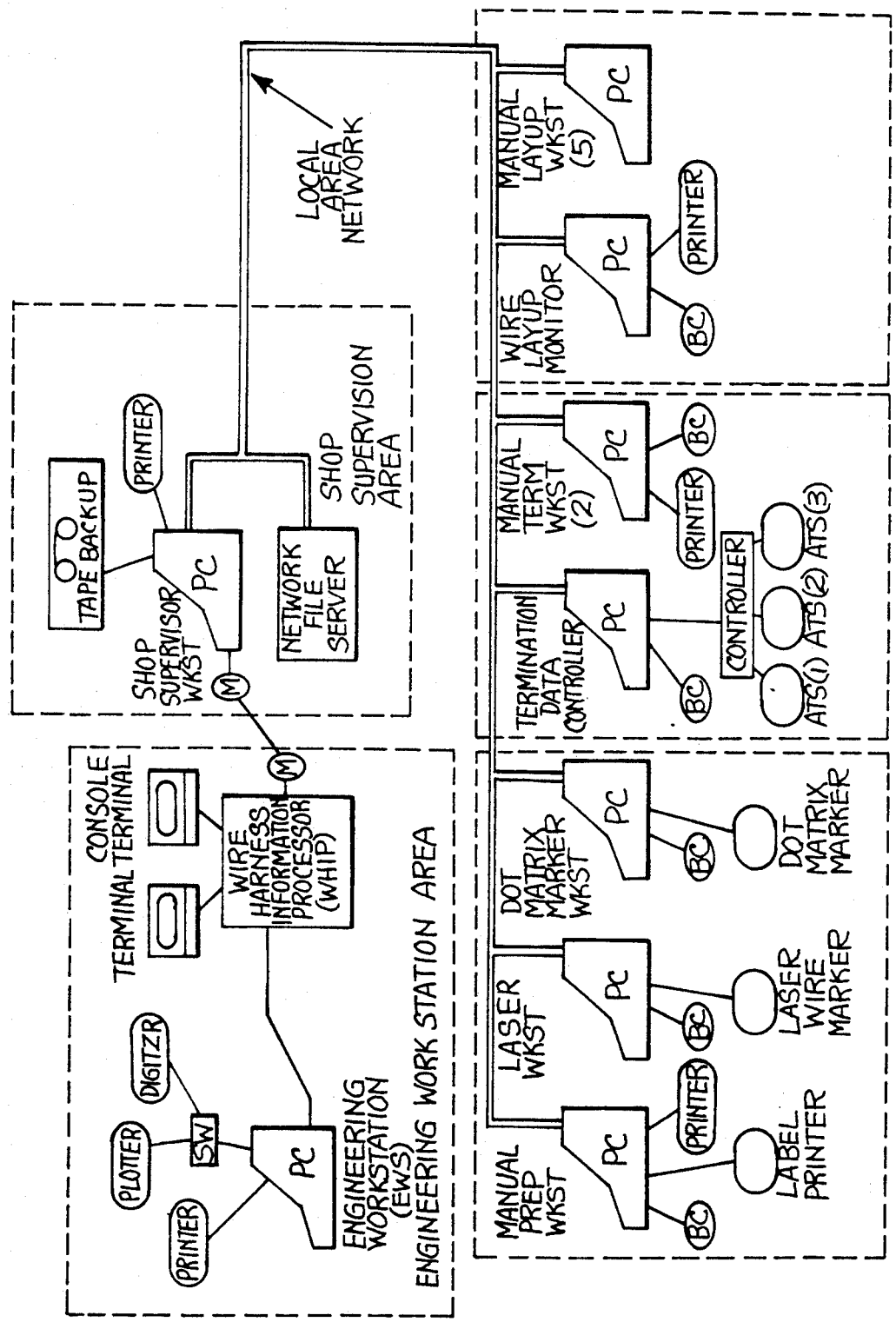
FIG. 2 is a schematic diagram of the system illustrated in FIG. 1, showing the main elements of the information processing subsystem and the communication subsystem.

As illustrated in FIG. 1, the elements of the system shown in FIGS. 1-13 may broadly be separated into engineering elements and manufacturing elements. The engineering elements comprise an information processing subsystem including an engineering work station EWS and a wire harness information processor WHIP. Both of these elements EWS, WHIP are located in the engineering work station area, as shown in FIGS. 1 and 2. The WHIP may take various forms. One example of a suitable wire harness information processor for use in the system illustrated in FIGS. 1-13 is the processor sold under the name Micro Vax II.

The main functions of the engineering work station are to develop engineering harness data and communicate it to the wire harness information processor WHIP. The EWS also generates form board drawings. The engineering harness data includes a wire harness configuration data file for each type of harness and a manufacturing process data base. The configuration data files are equivalent to design drawings along with engineering requirements. They contain a complete description of each wire harness, including the geometry of the harness, a parts reference list, a wire segment list, and special assembly and installation notes. The operator at the EWS modifies and updates the configuration data files, as necessary. The manufacturing process data base contains information regarding the relationships between the engineering design requirements of the harness components and the assembly tools and processes in the system.

Figure 4:
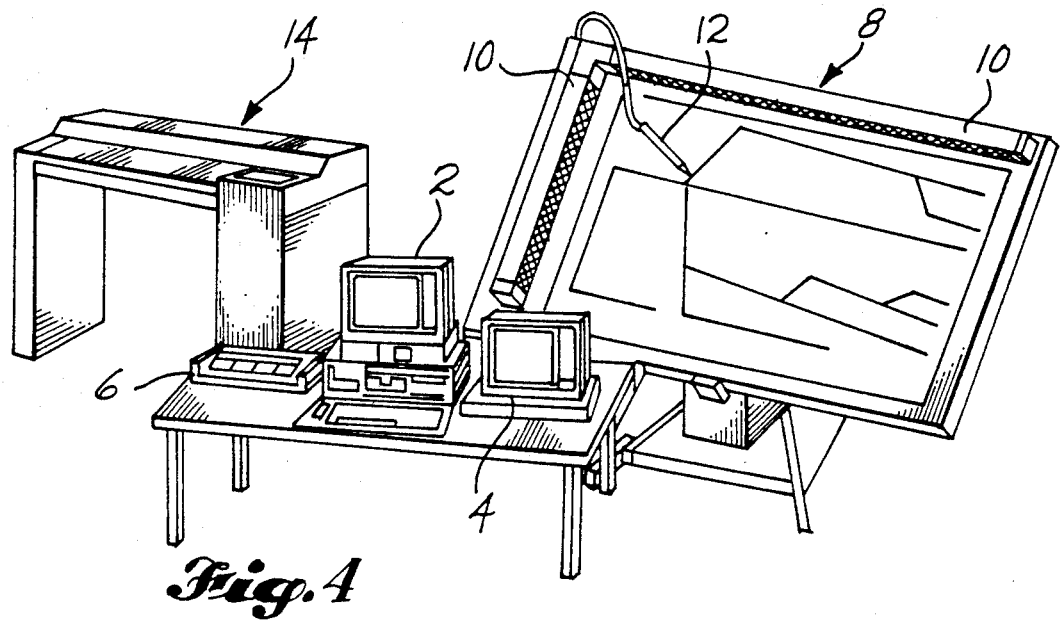
FIG. 4 is a pictorial view of the engineering work station illustrated in FIGS. 1 and 2.

Referring to FIGS. 2 and 4, the engineering work station EWS includes a personal computer (PC) 2 which is connected to a dot matrix printer 6 and, as shown in FIG. 4, preferably a second monitor 4. A digitizer board 8 and a drawing plotter 14 are also connected to the PC 2. The digitizer 8 is used to enter existing hard copy form board drawings of harness configurations into the computer 2. This is accomplished in a known manner by means of a two dimensional electronic grid 10 and an electric pen 12, shown in FIG. 4. The information input includes the identity and location of form board hardware, connectors, splice points, and other points of interest, as well as wire segment paths. The plotter 14 is used to create hard copy formboard drawings from digital information contained within the computer 2. The drawings created by the plotter 14 are enhanced by the computer 2 with added notes, symbols, and other markings to aid the manual layup operation. An electronic switch SW (FIG. 2) allows the operator at the engineering work station to select the digitizer board 8 or the drawing plotter 14. The hardware or software at the engineering work station includes an algorithm for computing the wire length for each wire segment based on the plotted geometry of the harness. The development of the engineering harness data also includes the designation of hardware positions and paths of wire harness bundles with reference to an alphanumeric grid. This information is used to assist the operators in the manual layup subsystem.

As shown in FIG. 2, the engineering work station PC is connected to the wire harness information processor WHIP. The connection permits the communication of data from the EWS to the WHIP, as illustrated in FIG. 1. This data includes wire harness configuration data and manufacturing process data. As mentioned above, the process data base contains the relationships between harness components and manufacturing system elements. These relationships include, for example, contact part number versus strip length, wire type and wire gauge versus stripping tools, wire type versus marking process, and contact part number and wire gauge versus crimping tools and tool adjustments. The manufacturing process data base is stored within the WHIP and may be updated by the engineering work station. The WHIP uses the wire harness configuration data from the EWS and the manufacturing process data base to construct the operating instructions, and compile other information necessary, for the manufacturing portion of the system. The WHIP creates and stores fabrication data files under the direction of the EWS. These files include operating instructions and material requirements lists for each harness.

The engineering portions of the system are connected to the manufacturing portions by means of a connection between the wire harness information processor WHIP and the shop supervisor work station, as illustrated in FIGS. 1 and 2. The shop supervisor work station is located in a shop supervision area along with a network file server. The shop supervision area is preferably near the work stations where the actual manufacturing processes are carried out. As shown in FIG. 2, the connection between the shop supervisor work station and the wire harness information processor WHIP is preferably accomplished by means of a telephone line connecting a modem M at the shop supervisor work station with a modem M in the engineering work station area. The shop supervisor work station has a personal computer PC with appropriate peripheral equipment, such as the printer and tape backup shown in FIG. 2. The network file server is a personal-computer with hard disk storage for the fabrication data files and status records. The shop supervisor PC is connected to the network file server by means of a local area network.

The shop supervisor generally supervises the manufacture of wire harnesses and tracks the status of the manufacturing process for each wire harness. The shop supervisor also generates system reports. The network file server stores and provides system-wide access to fabrication and status information. In addition, the file server stores a list of wire segments that need to be reprocessed. The operator at the shop supervisor work station enters each work order and assigns it a scheduled start date and a priority. The operator also monitors material requirements for the manufacturing operation. When a work order has been entered, the shop supervisor PC checks to see if the proper fabrication data file is available on the network file server. If it is not, the PC requests the file from the wire harness information processor WHIP. Upon such a request, the fabrication data file is copied to the network file server from the WHIP. The fabrication data file is then available to manufacturing work stations, which access the data when it is needed.

The exchange of fabrication data from the file server to the manufacturing work stations, and status information from the manufacturing work stations to the file server is illustrated in FIG. 1. FIG. 2 illustrates the communication subsystem elements which accomplish this exchange of information. As shown in FIG. 2, the manufacturing work stations are divided into three subsystems, a wire segment preparation subsystem, a termination subsystem, and a layup subsystem. Each of these three subsystems includes a plurality of personal computers PC that are connected to the network file server by means of the local area network. Each PC operates independently of the other PC's, including other PC's in its own subsystem, as well as the PC's in other subsystems. In the wire segment preparation subsystem, there is a manual preparation work station, a laser marker work station, and a dot matrix marker work station, each of which is equipped with a PC. These PC's are connected to bar code readers BC and a label printer, laser wire marker, and dot matrix marker, respectively. The manual preparation work station PC is also connected to a printer. In the termination subsystem, there are two manual termination work stations, each of which includes a PC connected to the local area network. There is also a PC for the automated portion of the termination subsystem which is connected to a master controller and three local controllers at three automated termination stations ATS, as described further below. The layup subsystem has a PC monitor for the overall subsystem and a PC at each of five layup work stations. All six of the PC's are connected to the local area network.

Figure 3:
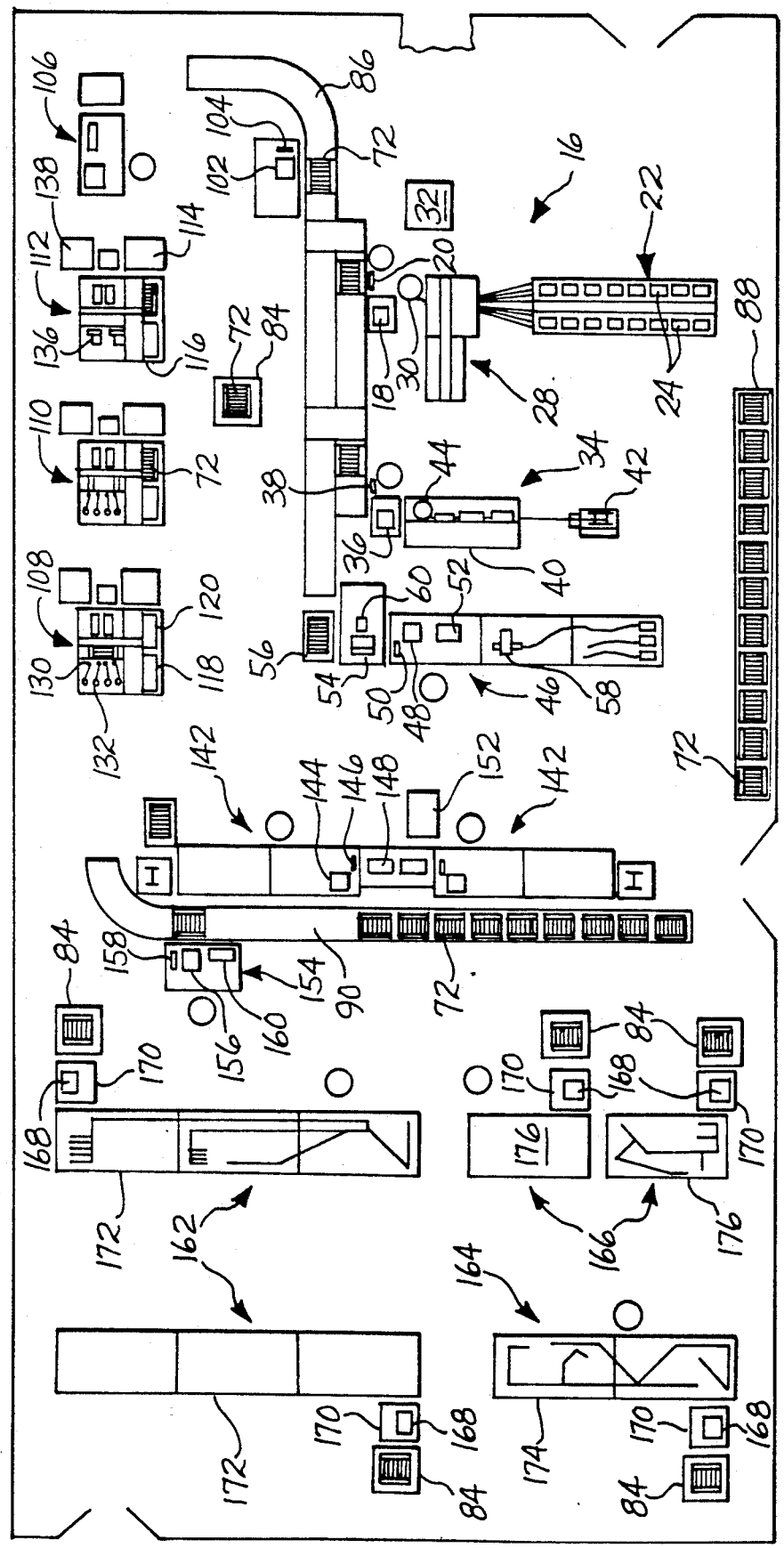
FIG. 3 is a partially schematic top plan view of the manufacturing portion of the system shown in FIGS. 1 and 2, excluding the shop supervision area.
Figure 5:
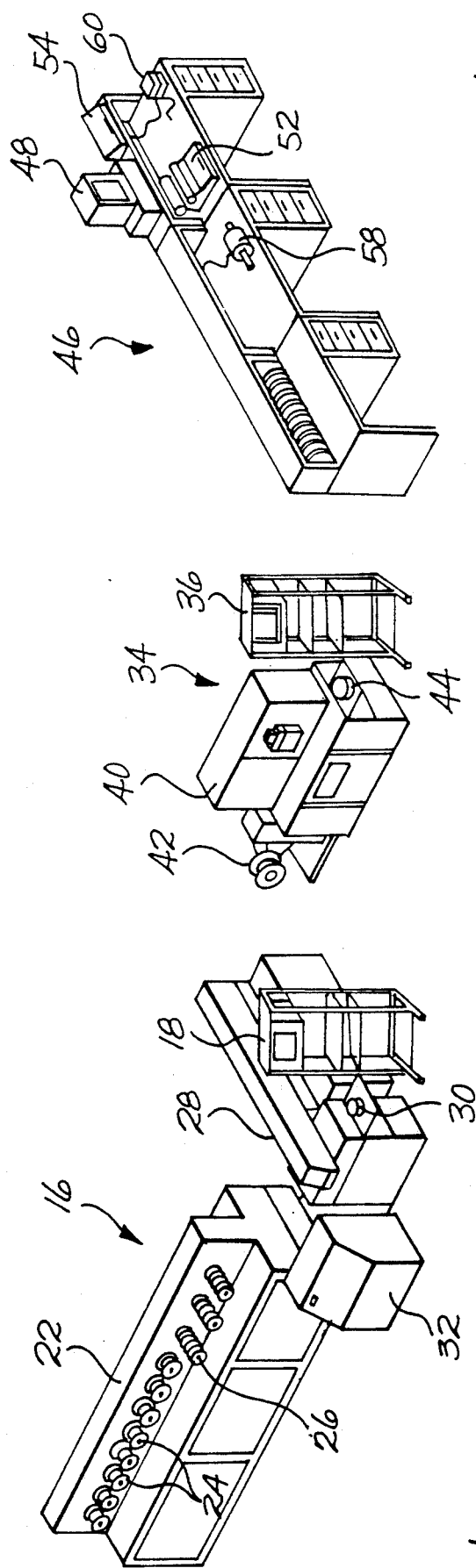
FIG. 5 is a pictorial view of three work stations in the wire segment preparation subsystem of the system illustrated in FIGS. 1-3.

The wire segment preparation subsystem is illustrated in FIG. 5 and the lower right hand portion of FIG. 3. As noted above, the subsystem comprises three work stations, a laser work station 16, a dot matrix work station 34, and a manual work station 46. Each of these work stations 16, 34, 46 operates independently under local control. In the subsystem, each wire segment needed for the fabrication of a harness is dereeled from a continuous source, measured, marked, cut, and coiled. The great majority of the wire segments are processed in the laser work station 16. Those segments which will tolerate an automated procedure but not the laser marking are processed in the dot matrix work station. Those segments which cannot be prepared at the automated stations are prepared at the manual work station 46. This arrangement of three different work stations allows for the quick and efficient preparation of the wire segments and, at the same time, accommodates a broad range of types and gauges of wire, including those that are not suitable for automated processing.

Referring to FIG. 3 and the left hand portion of FIG. 5, the laser work station 16 includes a dereeler 22 on which sixteen reels 24 of wire are mounted. The dereeler 22 has wire guides 26 for guiding and separating the wires from the reels 24. The wires extend from the dereeler 22 to a wire marker and cutter 28. To avoid reliability-problems associated with automated rethreading of wire, the wire from each reel 24 is threaded through its own dedicated feed mechanism. The threading is carried out by an operator when the reel 24 is installed, and the wire remains threaded until the reel 24 is exhausted and/or replaced by the operator. Cut segments from the marker/cutter 28 are coiled in a coiling pan 30 of a known type. The operation of the work station 16 is controlled by a personal computer 18 and a controller 32 associated with the marker/cutter 28. The computer 18 is connected to the local area network. The work station 16 is provided with a bar code reader 20 to identify wire carriers, as described further below.

The dot matrix work station 34 is shown in the middle portion of FIG. 5. It includes a single reel dereeler 42 and a dot matrix marker 40 which receives wire from the dereeler 42. The marker 40 marks the wire with ink and cures the ink with ultraviolet light as the wire moves through the marker 40. This procedure avoids the need for interrupting the movement of the wire through the system to heat cure the ink. The marked segments from the marker 40 are coiled in a coiling pan 44. The work station 34 has a personal computer 36 that is connected to the local area network and a bar code reader 38. The station 34 preferably has an alternate mode of operation in which an entire reel of low usage wire is marked without cutting it into segments. The marked reel is transported to a manual termination station for cutting as needed. This procedure reduces the need for manually applied heat shrink labels.

Referring to the right hand portion of FIG. 5 and still referring to FIG. 3, the manual work station 46 includes a personal computer 48 that is connected to the local area network, a printer 52, and a bar code reader 50. The work station 46 also includes a heat shrink label printer 54 that is connected to the computer 48. A label shrinker 60, a wire measuring device 58, and manual tools are also located at the work station 46. The station 46 preferably has a table 56 for a wire carrier 72, as shown in FIG. 3, the label printer 54 is used to ink print and heat cure shrink labels. The labels are installed on wires too large for, or otherwise incompatible with, the automated wire markers. The labels are in the form of sleeves and are installed by sliding them onto the wires. The label shrinker 60 is then used to shrink the labels into close engagement with the wires. At the station 46, wire is measured and marked and cut into segments and then coiled and loaded into a wire carrier 72. These tasks are performed by an operator who receives instruction and assistance from the network file server via the computer 48. The bar code reader 50 is used to input the bar code of the wire carrier 72 at the station 46 into the computer 48 to identify the segments being processed.

Figure 6:
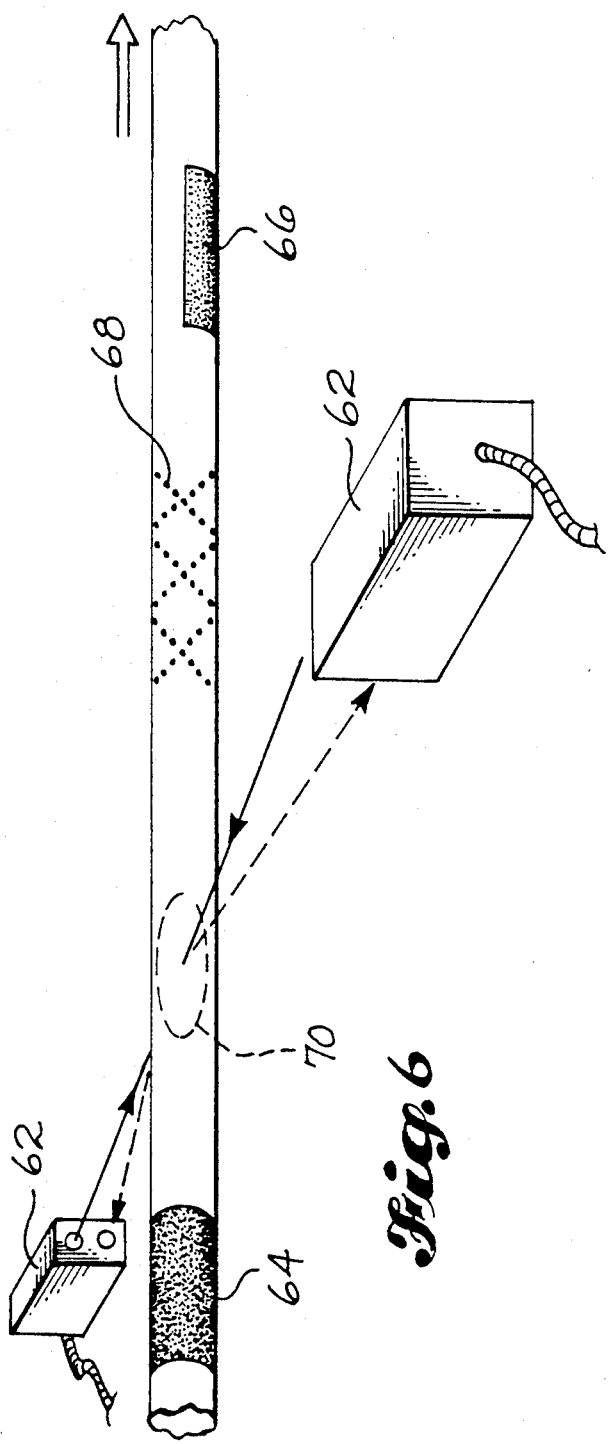
FIG. 6 is a pictorial view of portions of the preparation subsystem elements shown in FIG. 5 relating to the marking and cutting of wire.
Figure 7:
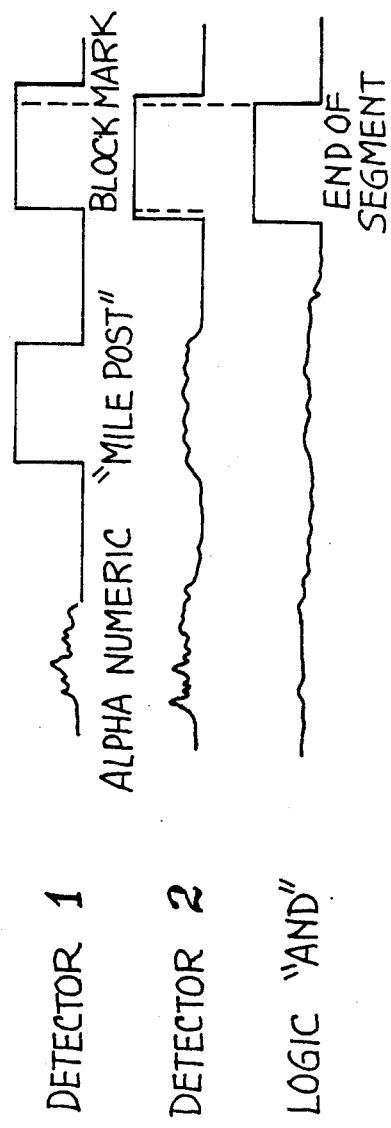
FIG. 7 is a set of three graphs illustrating the output of the detection system shown in FIG. 6.

FIGS. 6 and 7 illustrate an alternate method for marking wire with ink that must be heat cured. In order to obtain high speed throughput of the wire, the wire is marked without cutting it into segments and is respooled onto a single reel 24 of the type shown in FIG. 3. The respooled reel of wire is placed in an oven for heat curing. The curing process requires several hours. The reel of cured wire is loaded onto a machine (not shown) which cuts the continuous wire into the individual segments indicated by the block marks 64, described below. The machine has optical detectors 62, also described below, that detect the block marks 64, stop the movement of the wire through the machine, and align the block marks 64 at a cutting position. The cut segments are coiled in a coiling pan and loaded in a carrier 72.

Referring to FIG. 6, each wire is marked with alphanumeric characters 68 that correspond to a part number. At preset intervals along the wire, the wire is marked with "milepost" markers 66 that extend halfway around the wire. These milepost markers 66 correspond to specific formboard support hardware to facilitate and ensure the accuracy of the routing of wire in the layup subsystem. At the end of the segment length, a block mark 64 is made extending all the way around the wire. In the marker, the length is measured by a length encoder. In order to avoid the accumulation of errors in-length measurement by the sequential use of length encoders in the marking and cutting machines, the accuracy of the measurement in the cutting machine is verified and adjusted in the manner illustrated in FIGS. 6 and 7. Two optical detectors 62 are positioned on opposite sides of the wire. Each of these detectors 62 has an elliptical field of view 70. The optical response of the detector 62 is integrated over the entire field 70. The output of the two detectors 62 is combined to determine when the block mark 64 has been reached, as illustrated in FIG. 7. The wire is then cut at the middle of the block mark 64. The precision in the length of the cut segments and the use of the milepost markers 66 make proper routing of precut, pre-terminated segments in the layup subsystem possible.

At each work station 16, 34, 46, the operator selects a batch of wires to be prepared either by job number or by wire type. The selection is made by means of a menu displayed by the local PC 18, 36, 48. Once a job has been selected, the appropriate batch of data is downloaded from the file server into the PC 18, 36, 48. At the automated stations 16, 34, the wire is automatically marked, measured, cut, and placed in the coiling pan 30, 44. It is picked up from the pan 30, 44 by the operator and manually placed in a carrier 72, described below. The operator must indicate when a wire segment has been removed from the coiling pan 30, 44 by pressing a control button before the next wire can be processed. At all three work stations 16, 34, 46, the wire segments are manually placed in the carrier 72 in locations indicated by the PC terminal 18, 36, 48.

Wire segments that have been prepared in the wire segment preparation subsystem described above are transported from the preparation subsystem to the termination subsystem and subsequently from the termination subsystem to the layup subsystem by a wire segment transport subsystem. The transport subsystem includes a plurality of carriers 72 each of which is dimensioned to receive a batch of wire segments. The preferred embodiment of the wire carrier 72 for use in the system shown in FIGS. 1-13 is shown in FIG. 11. This carrier 72 is dimensioned to receive a batch of 50 wire segments. The transportation of wire segments in batches, and the corresponding communication of data in batches, is an important aspect of the system of the invention. It permits the control of the manufacturing process to be decentralized to thereby increase the reliability of the process. In addition, it permits asynchronous flow of the batches of wire segments through the system. The asynchronous flow permits accommodation and adjustments for different rates of productivity of the work stations and facilitates queuing of batches of wire segments between work stations to maximize the productivity of the overall system.

Referring to FIG. 11, the wire carrier 72 comprises a substantially rectangular open top container and a plurality of vertical dividers 82 which are slidably received into the container. A hanger 83 is secured to a top portion of each divider 82. In a fully loaded carrier 72, a coiled wire segment 100 is supported by and hangs down from each hanger 83. The ends of the segments 100 are held by clamps 78 on an upper horizontal flange on the carrier 72. The clamps 78 are indexed to locator members 80 which are engaged in automated work stations to enable a robot to accurately locate each of the segments 100 loaded in the carrier 72. Each carrier 72 has a bar code 74 printed thereon to identify the carrier 72 and the segments 100 loaded therein. Grip slots 76 are provided on opposite sides of the carrier 72 for grasping by a human operator.

In the system shown in FIGS. 1-13, the transport subsystem is substantially a manual subsystem. The carriers 72 are moved by human operators. The operators are assisted by wheeled carts 84 and roller tables 86, 90, shown in FIG. 3. A storage shelf 88 for empty carriers 72 is located near the preparation subsystem where the carriers 72 are loaded with the coiled marked wire segments 100. FIG. 11 illustrates the manual loading of a carrier 72, which is carried out with the aid of computer instructions. The carrier 72 and its use are described in more detail in applicant's copending application entitled "Wire Carrier and Method of Using Same".

When the loading of a carrier 72 with wire segments has been completed in the preparation subsystem, the carrier 72 is placed on the roller table 86 and logged into the termination subsystem. The arrival of the carrier 72 is entered into a subsystem personal computer 102 using a bar code reader 104. The computer 102 is connected to the local area network and an ATS master controller 106, and controls the flow of data into and out from the master controller 106. The computer 102 functions as a termination data controller that maintains a configuration status of each automated termination station. When a wire carrier 72 is entered into the controller 102, the controller 102 obtains the required fabrication data, which comprises a batch of termination data, from the network file server. The operator reviews the equipment requirements relative to the current automated termination station configurations. If reconfiguration is required, the operator signals the master controller 106, which displays reconfiguration information. The controller 102 transmits the termination data top the appropriate automated termination station. The carrier 72 is transported to the station, where the segments in thecarrier 72 are processed in accordance with the transmitted data under autonomous local control. When the termination processing has been completed at the automated termination station, the terminatin station signals a completion status to the controller 102. The controller 102 then directs the routing of the carrier 72.

As shown in FIG. 3, the termination subsystem includes three auotmated termination stations 208, 110, 112. The first two stations 108, 110 have the configuration shown in FIG. 9 and described in detail in the applicant's copending application entitled "Automated Termination Station and Method of Using Same". The third station 112 is simliar in structure and function to the first two stations 108, 110. The major difference is that the third station 112 is equipped with terminal lug crimpers 136 instead of the contact crimpers 130 and associated vibrator bowls 132 in the configuration shown in FIG. 9. Each of the two configurations is illustrated and described herein by way of example. The configurations may be varied considerably to meet the needs of a particular manufacturing operation.

Figure 9:
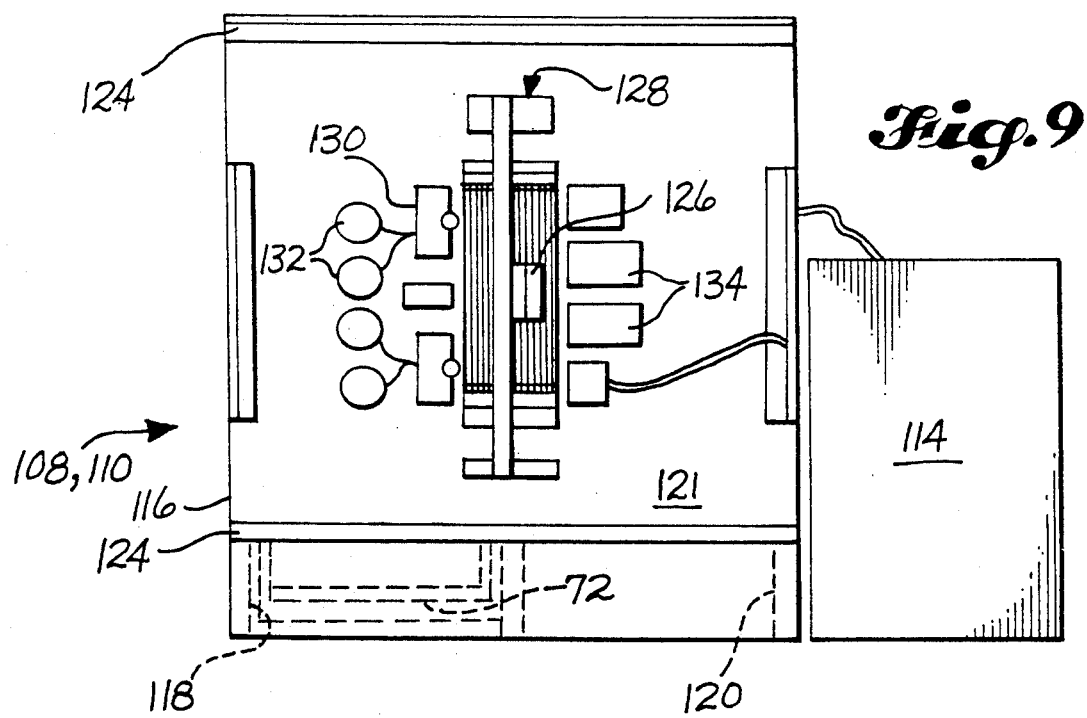
FIG. 9 is a top plan view of one of the automated terminations represented in FIGS. 1-3.
Figure 12:
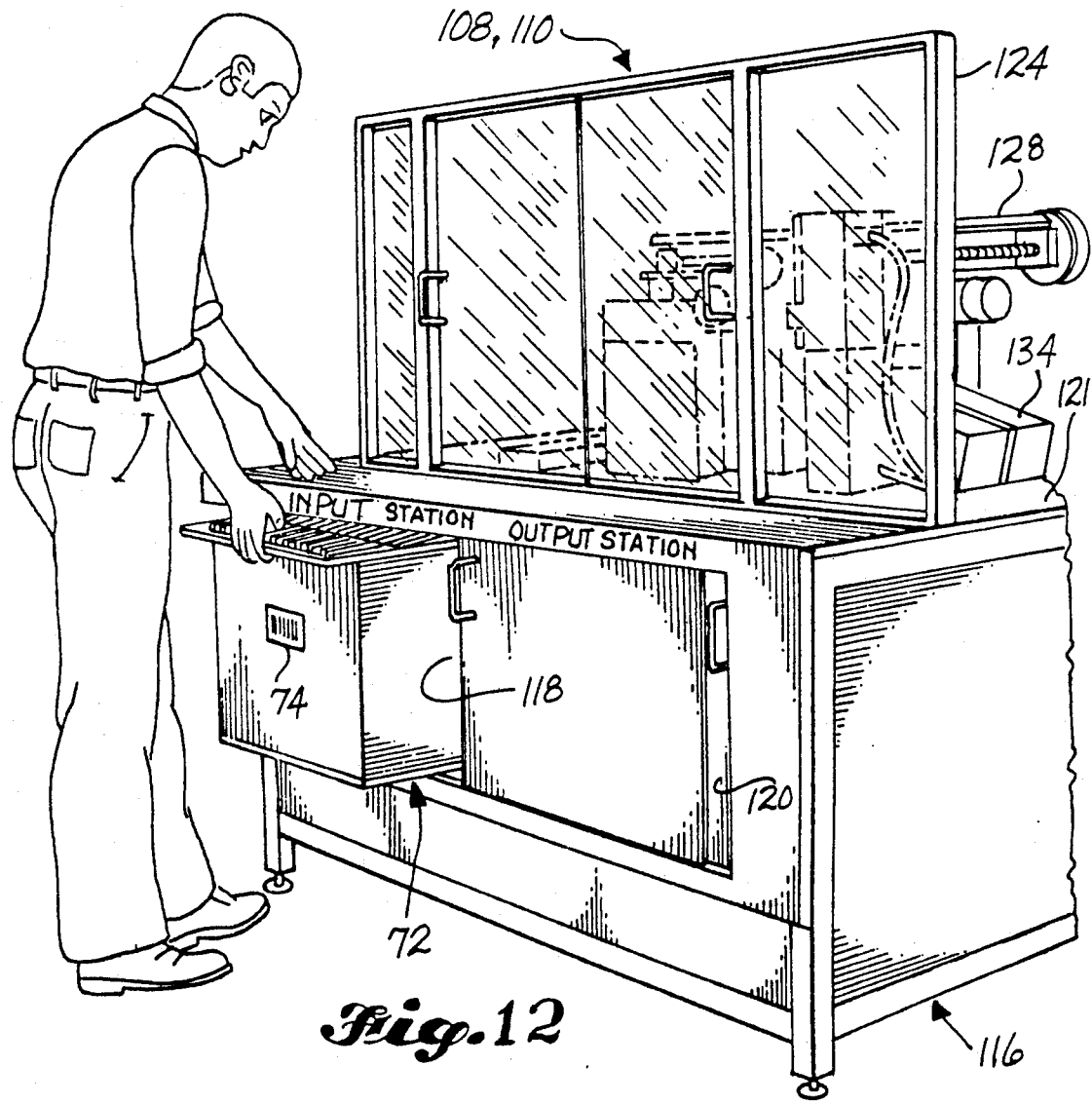
FIG. 12, is a pictorial view of the automated termination station shown in FIG. 9, illustrating the introduction of a carrier into the station.
Figure 13:
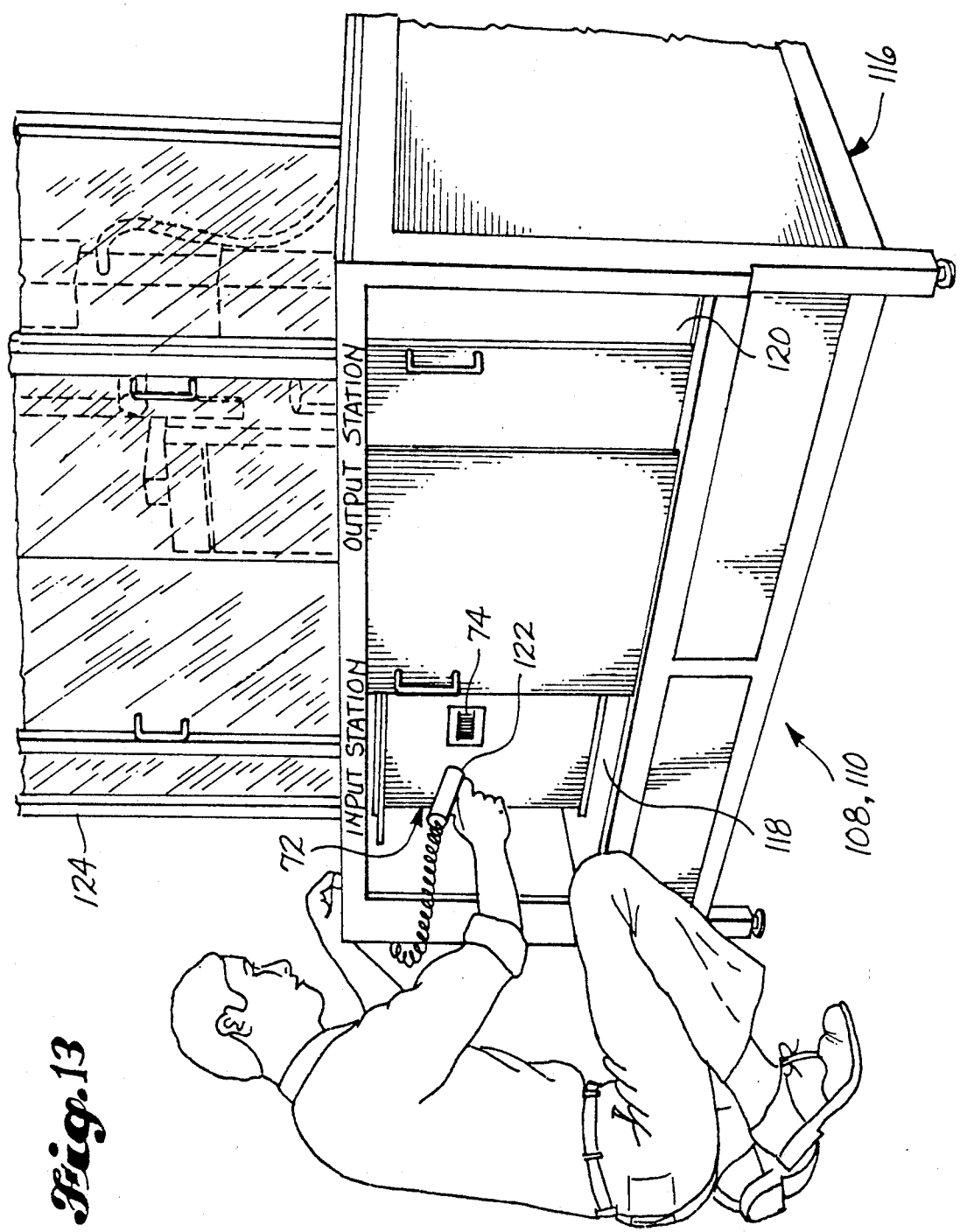
FIG. 13 is similar to FIG. 12 except that it shows the carrier in the input station of the automated termination station and the bar code information being entered.

The structure of automated termination stations 108, 110 is best seen in FIGS. 9, 12, and 13. Each station 108, 110 comprises a housing 116 that includes an input station 118, an output station 120, and a work depot. A horizontal mounting plate 121 is positioned above the input and output stations 118, 120 and the work depot. The station 108, 110 has a robot 126 which is supported and positioned by a support and drive mechanism 128, which is in turn supported by the mounting plate 121. The robot 126 accesses wire segments loaded in a carrier in the work depot through an opening in the mounting plate 121. The end processing devices are mounted on the plate 121 on the sides of this opening. The devices include the crimpers 130 and vibrator bowls 132 mentioned above and strippers 134. The mounting plate 121 also supports safety screens 124. The station 108, 110 is equipped with a bar code reader 122, shown being used by an operator in FIG. 13 to input the bar code 74 of a carrier 72 into the station 108, 110. The input and output stations 118, 120 allow queuing of incoming and outgoing carriers 72. FIG. 12 shows an operator introducing a carrier 72 into the input station 118.

As shown in FIGS. 3 and 9, each of the automated termination stations 108, 110, 112 preferably includes its own local controller 114. The controller is preferably provided with a power fault protector to enable an orderly shutdown of the station 108, 110, 12 in the event of an interruption of power to the station 108, 110, 112. The power fault protector may be incorporated into the controller 114 or be a separate free standing device 138, as shown in FIG. 3. FIGS. 2 and 3 show a three-level control system for the automated termination stations 108, 110, 112 that receives batches of data from the local area network. The data is received directly by the PC terminal 102 and is distributed to the local station controllers 114 through the master controller 106. The master controller 106 maintains configuration information for each of the stations 108, 110, 112, including the relevant process codes of the current configurations. The master controller 106 also monitors the functioning of the equipment at the stations 108, 110, 112 and supervises the repair or replacement of defective devices. Each carrier 72 that enters the termination subsystem is logged in at the PC terminal 102. The terminal 102 controls the routing of the carrier 72 to and between the automated termination stations 108, 110, 112, and when appropriate, to one of the manual termination stations The three-level communication and control subsystem described above is a distributed subsystem, as opposed to a highly centralized subsystem. The system of the invention preferably incorporates distributed control and communication. This type of control and communication has the advantage of increasing the overall reliability of the system. The autonomous local control of the subsystems and elements of the subsystems, particularly the automated termination stations, allows the subsystems and elements thereof to continue operating regardless of faults in other parts of the system. The queuing of batches of segments at the automated termination stations further enhances their independence and capability of remaining in operation. The distributed control and communication also helps to reduce the memory capacity requirements of the file server by allowing the file server to provide general instructions, which are interpreted by lower tier elements of the communication subsystem.

Figure 8:
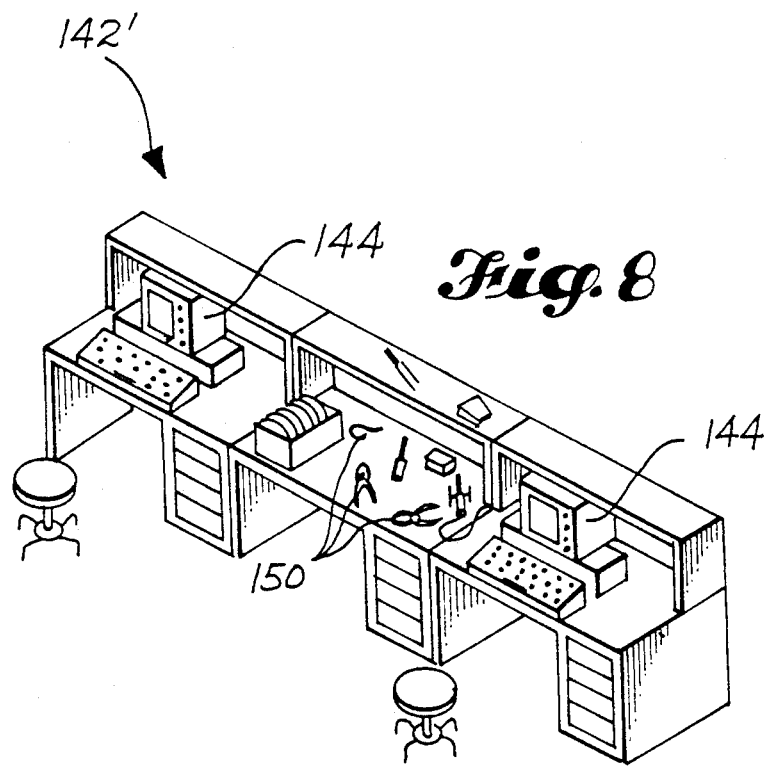
FIG. 8 is a pictorial view of a configuration of a manual termination work station which is a variation of the manual termination work station shown in FIG. 3.

Two manual termination stations 142 are shown in the center portion of FIG. 3. Each station 142 includes a personal computer 144. When the operator at the station 142 inputs the identity of a carrier 72 into the computer 144 by means of a bar code reader 146, the processing instructions necessary to allow the operator to carry out the required procedures are downloaded into the computer 144 directly from the file server. Each of the stations 142 is provided with a printer 148 that is connected to the computer 144. The station 142 also includes a table 152 to support and position a carrier 72 for convenient access by the operator. FIG. 8 shows a variation 142' of the manual termination station 142 shown in FIG. 3. As can be seen in FIG. 8, the station 142, is provided with a variety of manual tools 150 required to perform the manual termination procedures.

The procedures performed at the manual termination stations 142 include those procedures that cannot be accomplished at the automated termination stations 108, 110, 112 because of incompatibility with automated processing, and procedures which are performed sufficiently infrequently to make automated processing inefficient. The manual termination stations 142 also provide a backup to the automated termination stations 108, 110, 112. The functions of the stations 142 include wire termination (trimming, stripping, and contact and lug crimping), wire twisting, kit assembly, and special assembly Special assembly may be required, for example, in connection with coaxial connectors. Kit assembly may include connector pin insertion and routing wires through backshells. The computer terminal 144 provides the operator with instructions for each of these functions obtained from the file server. When all of the required processing of a batch of wire segments has been completed, the terminal 144 displays routing information. The kit and special assemblies and the materials therefor may be transported to and from the work stations 142 separately from the carriers 72.

Figure 10:
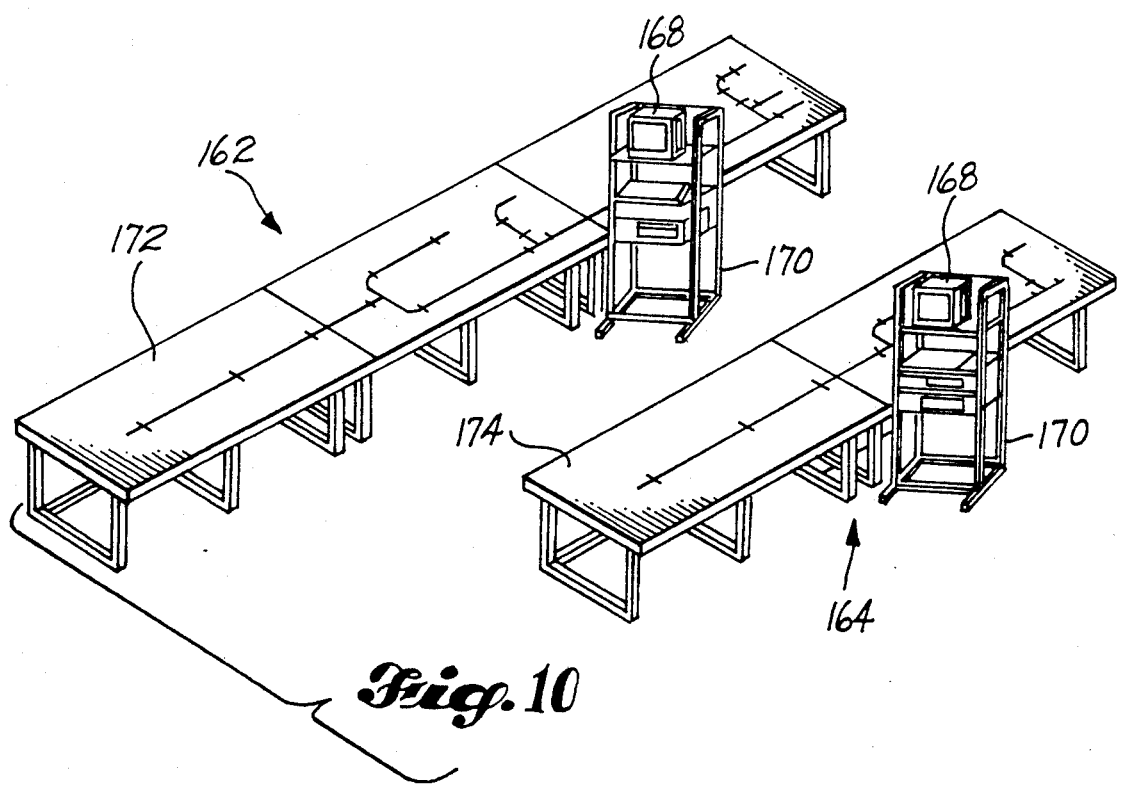
FIG. 10 is a pictorial view of two manual lay up work stations in the system shown in FIGS. 1-3.
Figure 11:
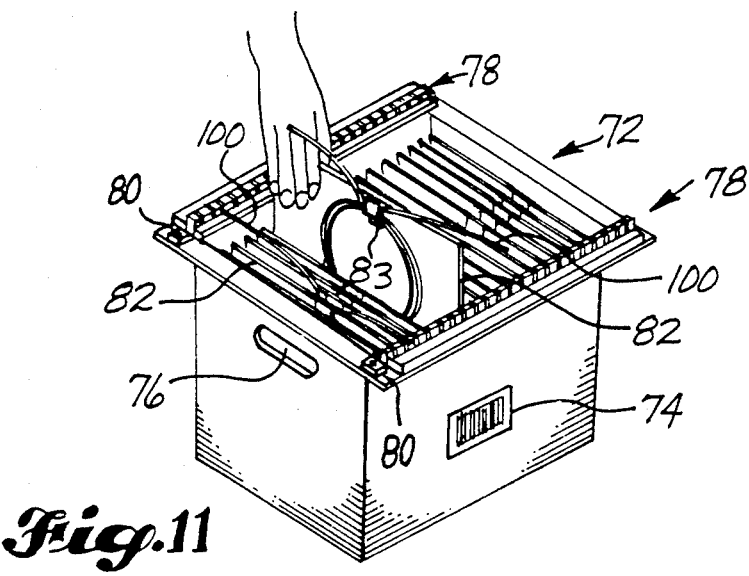
FIG. 11 is a pictorial view of the preferred embodiment of the wire segment carrier for use in the system illustrated in FIGS. 1-3, showing the carrier being loaded.

When all of the termination and related procedures required for the wire segments in a particular carrier 72 or assembly have been completed, the carrier 72 or assembly is delivered to the layup subsystem shown in FIG. 10 and the left hand portion of FIG. 3. Referring to FIG. 3, each carrier 72 or assembly is placed on a queuing roller table 90 and is logged in by the layup monitor 154. The monitor 154 includes a personal computer 156, a bar code reader 158 by which the carrier bar codes 74 are input into the computer 156, and a printer 160. The computer 156 is connected to the network file server by means of the local area network. The operator at the layup monitor 154 supervisors, with the assistance of data from the network file server displayed by the monitor 154, the queuing of wire carriers 72 and assemblies for each harness fabrication job in the system. The monitor 154 maintains status information on all harnesses in the layup subsystem When all the carriers 72 and assemblies for a layup job have arrived at the subsystem, the monitor 154 indicates whether the formboard for that harness is available. When the formboard is available, the operator, with the assistance of the monitor 54, prepares the formboard by attaching the formboard drawings thereto. The operator mounts gates, connector mounting hardware, and wire hooks on the formboard in accordance with notations and symbols on the drawings The layup assembly personnel assemble the harness This procedure includes routing terminated wire segments, assembling connectors, and incorporating kit and special assemblies.

As shown in FIGS. 3 and 10, the formboards 172, 174, 176 and associated manual layup work stations 162, 164, 166 may be of various sizes, depending on the size of the harness being assembled. The formboards 172, 174, 176 may conveniently be formed from one or more modular boards, each of which is approximately large enough to accommodate the smallest harnesses manufactured in the system. Two single module work stations 166 with single module formboards 176 are shown in FIG. 3. FIG. 3 and FIG. 10 also show a double module work station 164 and formboard 174. Two and one three-module stations 162 and formboards 172 are shown in FIGS. 3 and 10, respectively. The use of modular formboards and reconfigurable layup work stations helps maximize the flexibility of the layup subsystem and allows it to accommodate various types and sizes of harnesses and changes in the types and sizes of the harnesses being manufactured. The formboard modules are preferably adjustable tilt tables to give the layup operator good access to all portions of the formboard assembly. Referring to FIGS. 2, 3, and 10, each manual layup work station 162, 164, 166 is equipped with a personal computer (PC) 168 that is connected to the local area network. The computer 168 is supported on a computer and tool cart 70. FIG. 3 also illustrates a wire carrier cart 84 positioned at each of the work stations 162, 164, 166. The operator at the station 162, 164, 166 receives a complete tool list and all necessary instructions from the file server through the computer 168.

The carrying out of the method of the invention should be clear from the preceding description of the system illustrated in FIGS. 1-13. The method may be summarized as follows. In the engineering work station area, harness configuration data and process data is input into the system and is compiled into fabrication data by the wire harness information processor WHIP. The fabrication data is in the form of computer process control data. The control data is downloaded in batches to work stations in preparation, termination, and layup subsystems in response to requests for data from the subsystems. The requests are made to a network file server in a shop supervision area, which obtains the required data from the information processor WHIP. Wire from a continuous source is prepared in the preparation subsystem by dereeling, marking, measuring, and cutting the wire into segments of predetermined lengths. The prepared segments are loaded in batches into carriers 72. The batches of segments are transported in the carriers 72 from the preparation subsystem to the termination subsystem, which includes automated termination stations and manual termination work stations. The batches of wire segments are selectively transported to the termination stations and work stations within the termination subsystem, as needed. When the termination procedures have been completed, the batch of segments in the carrier 72 is transported to a manual layup subsystem where the prepared and terminated segments are manually assembled into completed harnesses with the assistance of data obtained from the network file server. Each of the preparation, termination, and layup subsystems and the work stations within such subsystems operates under local independent control.

Each of the components of the system is preferably of a known commercially available type with proven reliability. To the maximum degree possible, the components are plug-in replaceable. In addition, identical components, e.g. identical PC interfaces to the local area network, are used wherever possible. These component characteristics help to maximize the reliability of the system and the availability of parts for the system. They also facilitate quick and efficient replacement of components to correct failure conditions or to provide system reconfigurations.

Both the physical equipment and the software in the system have a modular structure. This modular structure facilitates the relative autonomy of the subsystems and individual work stations discussed above and the simultaneous manufacture of a plurality of harnesses. It also helps maximize the flexibility of the system and its ability to accommodate expansion and modification. Additional or substitute work stations can be incorporated into the system with relative ease. The modular character of the software allows individual software modules to be relatively simple. This keeps the cost of developing and maintaining the software at a low level while preserving a high degree of reliability. In addition, the modular nature of the system, in combination with the component characteristics discussed above, help minimize personnel skill requirements and training time for control and maintenance functions.

Figure 14:
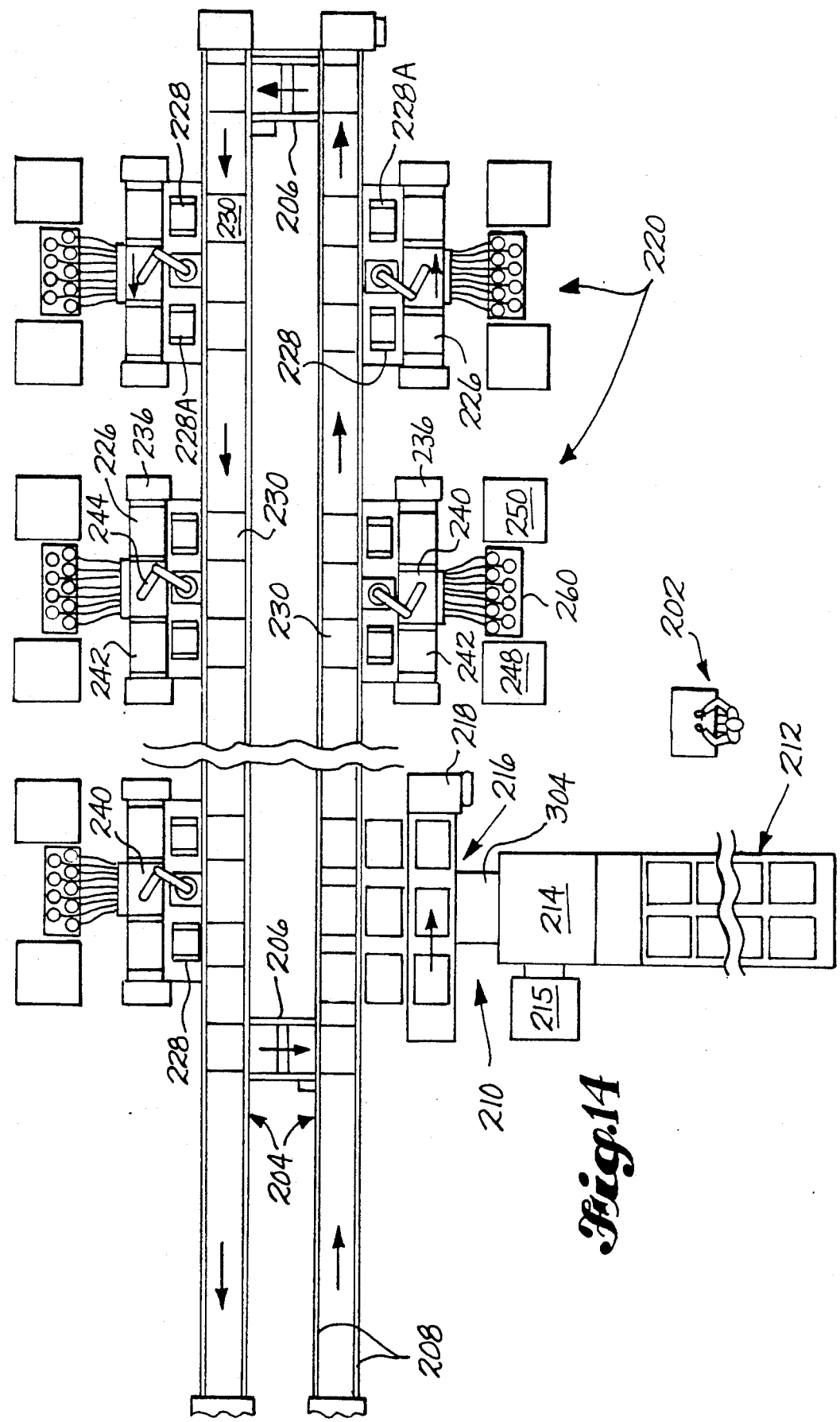
FIG. 14 is a schematic plan view of a second preferred embodiment of the system of the invention.

The second preferred embodiment of the system is illustrated in FIGS. 14-29. Like the system illustrated in FIGS. 1-13, the second embodiment includes a wire segment preparation subsystem and a termination subsystem. The preparation subsystem includes a plurality of preparation work stations 210, one of which is shown in FIG. 14. The termination subsystem includes a plurality of automated termination stations 220, five of which are shown in FIG. 14. The exact number of preparation work stations 210 and automated termination stations 220 in a particular system built in accordance with the second preferred embodiment depends on the desired production capacity of the system. The functions of the preparation and termination subsystems are similar to the corresponding subsystems in the first embodiment.

In the operation of the system illustrated in FIGS. 14-29, wire segments are prepared in the segment preparation subsystem. The segments are subsequently transported to and processed by the termination subsystem in sets corresponding to wire bundles. Each bundle may contain, for example, all the wires that will form a component part of a harness which is being manufactured by a larger system that incorporates the system of the invention. The data in the system of the invention is handled in batches that correspond to the wire bundles. On the request of a system controller, a batch of data for a bundle is downloaded to the system controller. The source of the data make take various forms, such as a simple high capacity memory storage device, an engineering work station area similar to that discussed above in connection with the first embodiment, or some other form of engineering work area. Batches of data are downloaded from the system controller to the various subsystems as needed. The system controller keeps track of the subsystems and the work in process.

At the preparation subsystem work stations 210, each bundle of wire segments is prepared from continuous wire sources in accordance with the data received from the system controller. Each wire segment is wound on a reelette 264, 264', 264" and loaded in a carrier 300, 300', 300", described further below. FIGS. 17-25 illustrate the first preferred embodiments of the reelette 264 and the carrier 300 in use in the system. The carriers 300 are transported to the automated termination stations 220 by an automated transport subsystem. Following processing at the automated termination stations 220, the carriers 300 are transported by the transport subsystem to a manual unloading station. A single bundle of wire segments may be loaded in one or a plurality of carriers 300. A bundle may be divided into groups of segments to facilitate subsequent processing. The system is highly automated and is intended to operate with only minimal human intervention. As shown, the system is designed to require human intervention only for the mounting of new reels of continuous wire and for routine maintenance and fault correction. The batch of data downloaded to the system controller provides all the processing information necessary for the system to automatically prepare and process the wire bundles.

The second preferred embodiment has substantially the same advantageous general characteristics discussed above in connection with the embodiment of FIGS. 1-13. The overall design and layout of the system is arranged to provide maximal accessibility of the components that are subject to wear. This facilitates maintenance of the system and replacement of components when necessary. Plug-in replaceability and ready accessibility of at least most of the components makes it possible to carry out most maintenance and replacement quickly and efficiently on site on the shop floor The individual work stations 210, 220 of the subsystems can be temporarily shut down for maintenance or repair without removing the stations 210, 220 from the transport subsystem and without disturbing the operation of other portions of the system. As in the first embodiment, wherever possible the components are commercially available equipment with established histories of reliability. The elements of the communication subsystem, including the software and the controllers, are modular in design to maintain a high degree of flexibility in the capacity of the system to be expanded and/or modified.

Figure 15:
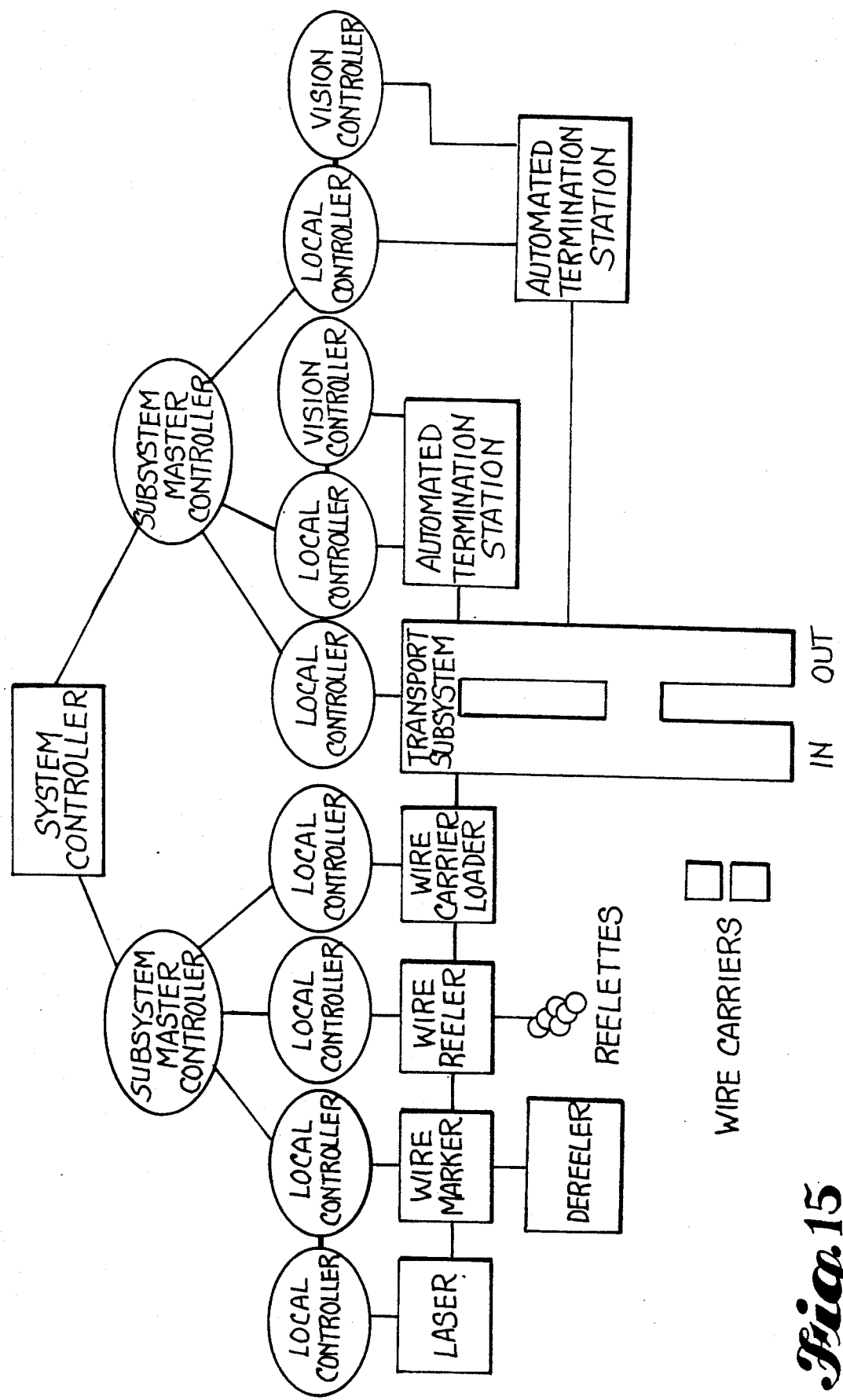
FIG. 15 is a schematic diagram of the communication and control subsystem of the system shown in FIG. 14.

The communication and control subsystem is illustrated in FIG. 15. The subsystem includes the system controller referred to above, a subsystem master controller for each of the preparation and termination subsystems, and local controllers in these two subsystems. The system controller comprises a main processor and a file server. Preferably, the controller has sufficient memory to operate for a full eight hour work shift without needing additional downloads from the engineering work area or other source. In order to avoid disruption of the manufacturing process, the controller is capable of shutting down in an orderly manner in case of a power failure and resuming operation with only minimal operator intervention. The system controller prepares and distributes data to the local controllers of the subsystems via the subsystem master controllers. The preparation of the data includes tailoring data from the engineering source, priority data, and other relevant data to the capabilities of the subsystems. The transfer of data to the subsystems is accomplished in a manner that does not interrupt the production operations of the subsystems. The batches of data received by the subsystems are arranged to enable the subsystems to operate independently.

The data received by the system controller from the engineering source has been sorted into formboard layup sequences for the wire groups and bundles The system controller assigns each segment in each group or bundle to a specified location in a wire carrier 300 The system controller also sets an order of priority for the bundles that are scheduled to be processed by the system of the invention. The system controller determines the most efficient sequence for processing the wire segments in each carrier 300 and guides the operations to achieve the sequence. For example, the order in which the segments are processed by the wire marker 214 is chosen to minimize the time spent placing the segments in the carriers 300 in the prescribed sequence. When the segments in a carrier 300 need to be processed by more than one automated termination station 220, the carrier 300 is transported to any one of these stations 220 that is available in order to use the available capacity of the termination subsystem to the greatest extent possible. If more than one carrier 300 is queued for a particular termination station 220, the order in which the carriers 300 are processed by the station 220 is determined by the priority of the bundles which the wire segments in the carriers 300 form a part of. The system controller, in general, plans and manages the flow of work through the system and assigns work packages to the work stations 210, 220 of the preparation and termination subsystems to maximize the efficient utilization of the system processing capability. The system controller includes a main control console 202 where an operator initiates, controls, and monitors the system operations.

In the operation of the system, a batch of data corresponding to a wire bundle is obtained by the system controller from the engineering source. Once the data is obtained, the operator at the control console 202 enters commands to set a priority rating for the bundle. When the processing of the bundle is to be initiated, the system controller directs the transport subsystem to position wire carriers 300 filled with empty reelettes 264 for loading at the preparation subsystem. As the carriers 300 are being loaded, the local controllers in the preparation subsystem send status data to the system controller. The system controller keeps a status record of the location of each segment in each wire carrier 300. The status record is created as each carrier 300 is being loaded Before a carrier 300 is transported to the termination subsystem, the system controller checks the status record to verify that the carrier 300 contains all the needed segments.

In addition to its communication and control functions, the system controller has a reporting function. The system controller compiles raw status data received from the subsystems and stores it for use in preparing reports relating to the completion of wire bundles and statistical process control. An operator at the system controller can selectively print some or all of the data stored by the controller. For example, the operator can generate a printout relating to any of the wire carriers 300 in the system including the wire carrier number and the location of each reelette 264 within the carrier 300, and processing information from the engineering source relating to each wire segment in the carrier 300. This type of report is useful for ensuring the proper routing of the carrier 300.

The system controller also monitors error data generated by the subsystems. If the data indicates a trend, the system controller alerts the appropriate operator to take preventive action.

The wire carrier transport subsystem is illustrated in FIGS. 14 and 15. As shown in FIG. 15, the transport subsystem has its own independent local controller that is in communication with the system controller, via the termination subsystem master controller, and operates under the direction of the system controller. The transport subsystem delivers carriers 300 with empty reelettes 264 to the preparation subsystem to be loaded, receives loaded carriers 300 from the preparation subsystem, and transports the loaded carriers 300 to the automated termination stations 220 of the termination subsystem. The transport subsystem includes a main endless-belt type conveyor 204, shown in FIG. 14. The conveyor 204 has two parallel legs, each of which includes a pair of laterally spaced belts 208 for transporting carriers 300. The legs of the conveyor 204 are connected to each other by longitudinally spaced crossover conveyors 206, two of which are shown in FIG. 14. The rectangles in FIG. 14, such as the rectangles 230, indicate carrier positions The transport subsystem has a manually loaded input queue for wire carriers 300 with a capacity of, for example, ten wire carriers 300. Carriers 300 are automatically received onto the left end of the lower leg of the main conveyor 204 (as shown in FIG. 14) from the input queue. Once it has been received onto the main conveyor 204, each carrier 300 is handled automatically by the transport subsystem until the processing of the wire segments assigned to the carrier 300 has been completed and the carrier 300 is delivered to the subsystem exit station. The exit station is located at the left hand end of the upper leg of the main conveyor 204 (as shown in FIG. 14). Carriers 300 arriving at the exit station are automatically placed in an exit queue, with a capacity similar to the capacity of the input queue, from which they are manually unloaded.

The inclusion of the crossover conveyors 206 in the transport subsystem gives the subsystem the capacity to transport a carrier 300 from any work station 210, 220 in the system to any other work station 210, 220. In other words, each carrier 300 may be recirculated within the system Each of the work stations 210, 220 has an internal conveyor system that receives a carrier 300 from the transport subsystem main conveyor 204, moves the carrier 300 within the station 210, 220, and returns the carrier 300 to the conveyor 204. The transport subsystem local controller manages the wire carrier traffic under the direction of the system controller. Preferably, the carriers 300 are moved by the transport subsystem at a rate sufficient to maintain a carrier 300 in queue at each automated termination station 220. This helps ensure maximized use of each termination station 220 and thereby increases the overall efficiency of the system.

As noted above, the preparation subsystem of the embodiment of the system of the invention shown in FIGS. 14-29 includes a plurality of preparation work stations 210. It is currently anticipated that each of the work stations 210 will be identical to the other work stations 210. The stations are spaced along the main conveyor 204 and interface with the conveyor 204 in the manner illustrated in FIG. 14.

Each station 210 includes a dereeler 212 similar to the dereeler 22 in the laser work station 16 of the embodiment shown in FIGS. 1-13. The dereeler 212 has sixteen mounting positions for receiving sixteen spools of wire. The spools are manually loaded onto the dereeler 212. Each individual spool is separately accessible and may be replaced while the dereeler 212 is operating without exposing the operator to hazard from other spools.

The dereeler 212 selectively dereels wire from the spools and switches from spool to spool, as necessary for creating the wire segments indicated by a data download. The dereeler 212 senses an out-of-wire condition and stops a spool before the trailing end has been completed unwound from the spool. The local controller for the dereeler 212 and wire marker 214 (FIG. 15) then signals the operator to mount a new spool. The wire from the new spool is threaded through the dereeler 212 by manually splicing the leading end of the wire on the new spool onto the trailing end of the wire on the spent spool. The resulting splice is detected by the wire marker 214 and processed in the same manner as a randomly occurring splice, as described further below. Each type of wire may be mounted on any one of the sixteen spool positions, and the same type of wire may be mounted on more than one spool position. This allows the dereeler 212 and wire marker 214 to switch automatically to an alternate spool when the primary spool has run out.

Referring to FIG. 15, wire from the dereeler 212 is fed into the wire marker 214. The wire marker 214 and dereeler 212 operate under a single local controller. The laser 215 associated with the wire marker 214 has its own independent local controller that operates under the direction of the wire marker local controller In turn, the marker local controller operates under the direction of the system controller via the subsystem master controller.

The marking of the segments by the laser 215 may be accomplished in substantially the same manner as the marking in the laser work station 16 in the embodiment of FIGS. 1-13. Preferably, the wire is marked on-the-fly with selectable, multiple digit, metal masks which yield alphanumeric coding. The wires are marked at suitable intervals along their length, such as at three inch intervals. The marker 214 is capable of marking a wide range of wire types, including stranded single-conductor insulated wires and jacketed cables containing one or more wires. The laser output pulse energy is variable and is controlled by the marker 214 over a range that includes levels suitable for each of the types of wire being processed. The marker 214 monitors the laser pulse power to ensure that the power does not reach a level which could damage the main wire jacket of the wire currently being marked. The operation of the wire marker 214 is normally carried out entirely automatically with no operator intervention. However, an operator can override the automated operation and control the marker 214 via manual input into the control console of the marker local controller. In normal automated operation, the marker 214 processes wire in accordance with batches of data downloaded from the system controller and under the direction of the system controller. The marker automatic functions include selecting and receiving wire from the dereeler 212, measuring the wire as it passes through the marker 214, and marking the wire with the laser 215. As the end of each wire segment leaves the marker 214, it is cut by a guillotine-type wire cutter 318 (FIG. 22) that is an integral part of the marker 214.

The automated functions of the marker 214 also include detection of imperfections in the wire and damage caused by the laser marking. The marker 214 includes a splice detector of the spark tester or electrical continuity type. When a splice is detected, the marker's local controller directs the aborting of the processing of the current segment and the discarding of the segment. Then, a replacement segment is automatically generated. The wire marker 214 also detects wire knots. When a knot is detected, the local controller directs the aborting of the processing of the segment and signals the operator to correct the fault. When the operation of the marker 214 is restarted following the correction of the fault, the aborted segment is automatically replaced. The splice and knot detectors are positioned upstream of the marking cavity of the marker 214. The output of the laser 215 is disabled when a wire segment with a splice is passing through the cavity. A spark tester for testing insulation integrity of a marked segment is positioned downstream of the marking cavity. If the tester detects insulation damage, the same procedure is followed as in the case of a splice detection, and the damaged segment is aborted and discarded and then replaced by another segment.

At the startup of the operation of the marker 214, the local controller provides the operator with any necessary instructions regarding the mounting of wire on the dereeler 212. Upon the mounting of a spool of wire, the operator enters information into the local controller indicating the wire type and size and the location of the spool on the dereeler 212. The local controller communicates status information relating to any changes in configuration to the system controller. During operation of the marker 214, the local controller alerts the operator when a spool needs to be replaced. Throughout the process and upon completion of a work package corresponding to a batch of data downloaded to the local controller from the system controller, the local controller communicates status information to the system controller. In addition, the marker local controller sends a report regarding each error detected to the system controller. Status information may also be communicated to the wire reeling local controller from the marker local controller via the subsystem master controller. This allows the coordination of wire movement in the marking and reeling portions of the subsystem.

Marked wire from the wire marker 214 is received by a wire reeler 304 downstream of the marker 214. The reeler 304 reels each segment onto a separate reelette 264 and loads the filled reelette into a wire carrier 300 The reelettes preferably can accommodate wire segment lengths from about two feet or less to about 150 feet. Like the wire marker 214, the wire reeler 304 operates automatically.

Figure 26:
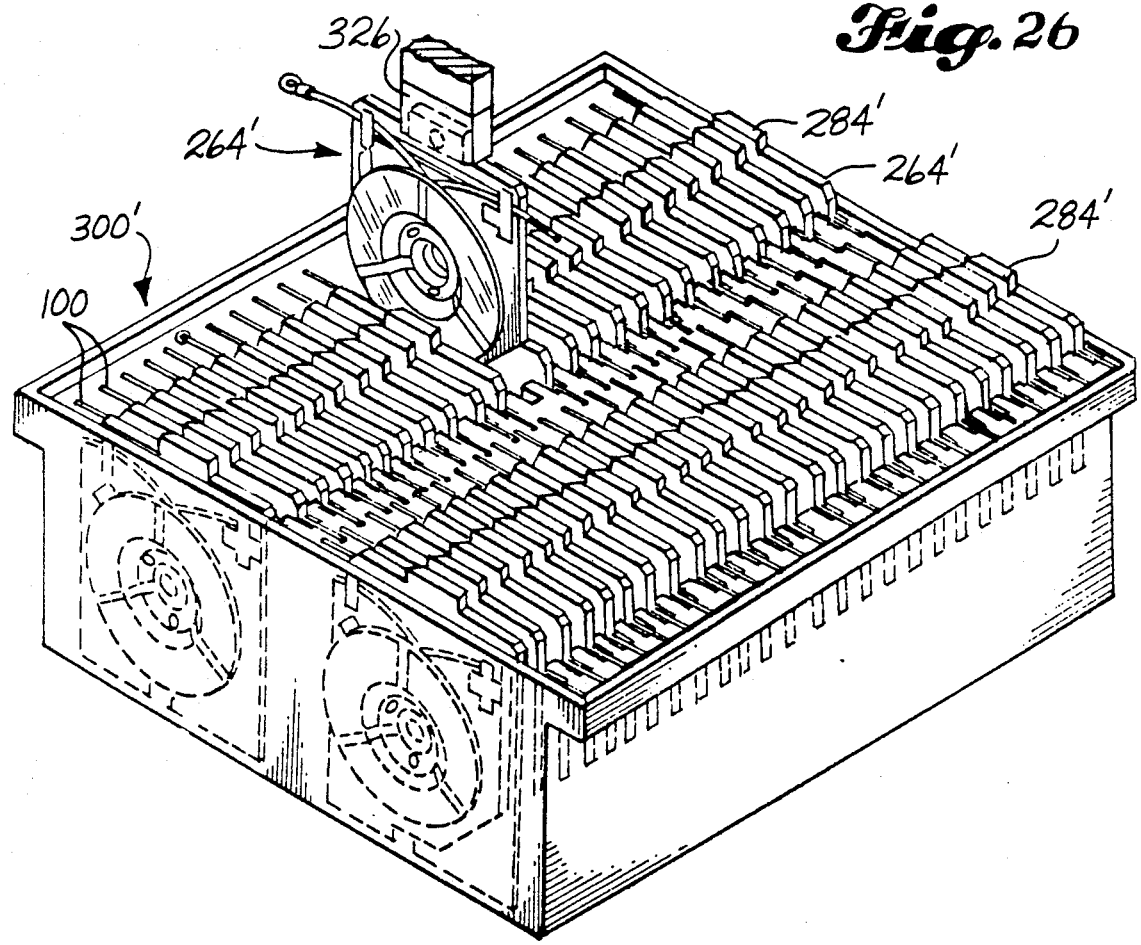
FIG. 26 is a pictorial view of a wire carrier into which a plurality of reelettes of the type shown in FIG. 16 are loaded.

An embodiment of the reelette 264' is shown in FIGS. 16 and 26. FIG. 26 also shows a carrier 300' adapted to receive a plurality of the reelettes 264'. Preferably, the carrier 300' is dimensioned to receive fifty reelettes 264'. Referring to FIG. 16, the reelette 264' includes a rigid back plate 266' and a removable cover 268' that form a center axial hub 270'. The cover 268' and plate 266, abut each other over a short distance radially outward from the hub 270'. Then, the cover 268' forms an inner shoulder 272 to space the cover 268, axially from the plate 266'. An outer shoulder 274 is formed radially outwardly of the first shoulder 272 to increase the space between the cover 268' and plate 266'. The spacing of these two main elements of the reelette 264' facilitates winding of a wire segment 100 thereon.

The ends of a wire segment 100 wound onto the reelette 264' are held in position by clamps 276', 278' carried by the back plate 266'. The back plate 266' has recesses for the clamps 276', 278' and a lateral groove 262 to offset the clamps 276', 278' and the leading end of a wire segment 100 clamped thereby from the winding plane of the reelette 264' (defined by the main flat front surface of the plate 266'). This offset prevents the clamps 276', 278' and segment leading end from interfering with the winding of the segment 100 onto the reelette 264'. The cover 268' and back plate 266' have a plurality of holes 280' and slots 282' extending therethrough parallel to the axis of the hub 270'. These holes 280' and slots 282' receive the pins 302 of a pin hub portion 312 of the reeler 304 to facilitate the securing of the trailing end of the wire segment 100, as described below. A grip lug 284' projects upwardly from the top of the back plate 266'. The lug 284' provides a means by which the work head 326 of a robot can grip the reelette 264', as illustrated in FIG. 26.

Figure 29:
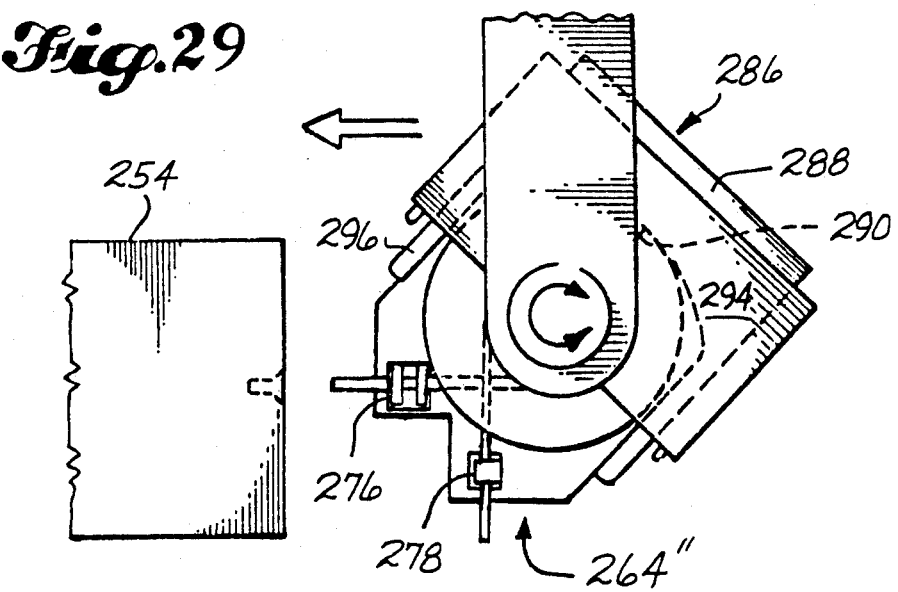
FIGS. 28 and 29 are elevational views illustrating a loading mechanism and procedure for the reelette and carrier shown in FIG. 27.
Figure 27:
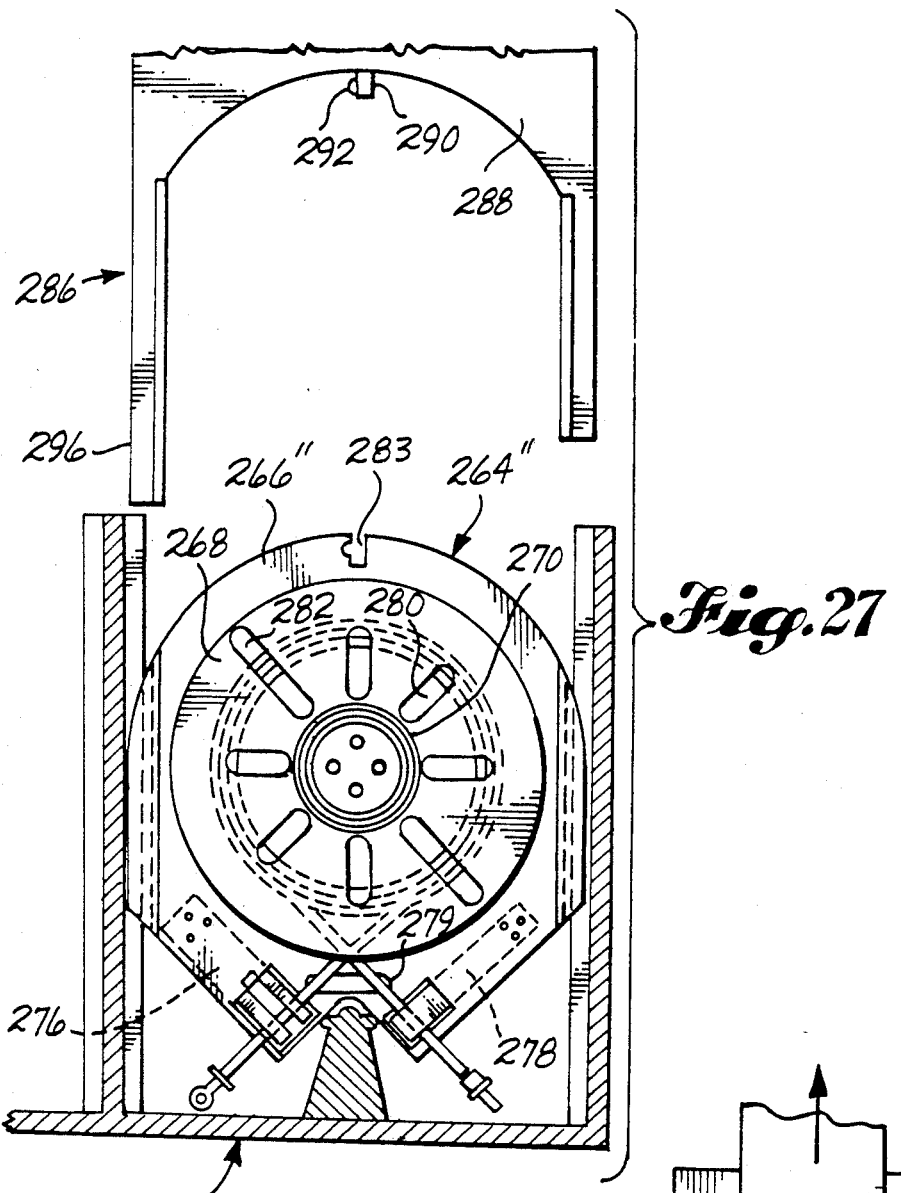
FIG. 27 is a sectional view of an alternative embodiment of the reelette and carrier.
Figure 28:
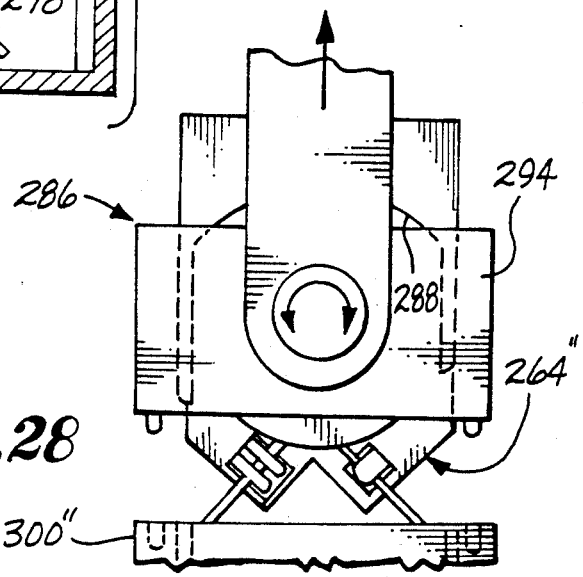

FIGS. 27-29 illustrate another form of the reelette 264" and carrier 300". The reelette 264" has a plurality of slots 280, 282 that function similarly to the holes 280' and slots 282, in the reelette 264'. A major difference between the two forms of the reelette is that the wire segment ends project from the bottom of the reelette 264" at an angle of about 90° to each other, rather than projecting laterally outwardly from a top portion at an angle of 180° to each other, as in the reelette 264' shown in FIGS. 16 and 26. The reelette 264" shown in FIGS. 27-29 is designed to be loaded in a carrier 300" in an orientation in which the wire segment ends are in the bottom portion of the carrier 300" (FIG. 27), rather than in the top portion, as in FIG. 26.

The reelette 264" shown in FIGS. 27-29 has a back plate 266" and a removable round cover 268 joined together at a hub 270. The cover 268 is flat radially outward of the hub 270 and lacks the shoulders 272, 274 of the embodiment 264' shown in FIG. 16. The hub 270 provides the spacing of the back plate 266" and the cover 268. Two clamps 276, 278 are carried by the back plate 266" for securing the ends of a wire segment 100 in the 90 orientation One end of each clamp 276, 278 is secured to the back of the plate 266,, The free ends of the clamps 276, 278 extend through openings in the plate 266" and over the wire segment ends to clamp the segment ends against bridges of material across the openings. The bridges support the wire to prevent it from being bent by the clamps 276, 278. They also form grooves to offset the segment ends, as described above in connection with the embodiment of FIG. 16. A guide slot 279 extends through the back plate 266" between the clamps 276, 278 to receive a guide pin in the reeler 304, as described below A grip slot 283 is formed on the top edge of the back plate 266" opposite the clamps 276, 278.

A mechanism 286 for loading reelettes 264" into the carrier 300" and removing them therefrom is illustrated in FIGS. 27-29. The mechanism 286 has a gripper bar 288 slidably mounted on a housing 294. The bar 288 carriers a center latch member 290 with a retractable detent 292 for engaging the grip slot 283 in the reelette 264". The bar 288 has depending legs 296 that engage slots on the edges of the reelette back plate 266". The carrier 300" has vertical slots for receiving the legs 296 and the plate edges The mechanism 286 is shown in FIGS. 27-29 being used to handle reelettes 264" in an automated termination station. FIG. 27 shows a reelette 264" that has just been loaded into a carrier 300" or is about to be removed therefrom FIG. 28 illustrates the moving of the reelette 264" vertically upwardly away from the carrier 300". As shown in FIG. 28, the gripper bar 288 is in its fully raised position relative to the housing 294. After the reelette 264', has cleared the carrier 300", the gripper bar 288 is moved downwardly relative to the housing 294 to provide clearance for end processing devices. This is illustrated in FIG. 29 in which one of the wire segment ends is positioned to be inserted into one of the funnel-shaped openings in a wire stripper 254. The mechanism 286 may be used in the preparation subsystem as well as for handling the reelettes 264" in the automated termination stations 220.

The reelette 264 shown in use in the system in FIGS. 17-25 has features in common with both of the previously described reelettes 264', 264". The reelette 264 has the structure of the reelette 264" of FIG. 27 except for the robot-engaging and edge portions of the back plate 266. The back plate 266 of the reelette 264 has a lug 284, like the lug 284' shown in FIG. 16, for a robot to grip, rather than the grip slot 283 of FIG. 27. The back plate 266 also has flat, rather than slotted, edges since there is no need for a robot to engage the edges. The carrier 300 for the reelette 264 is like the carrier 300', of FIG. 27 except that its vertical slots for receiving the edges of the back plates 266 have the form shown in FIG. 26.

The reelettes 264, 264', 264", the carriers 300, 300', 300", and the loading mechanism 286 are described further in the applicant's copending application relating to the automated termination station, referred to above.

Referring to FIGS. 17-22, in the illustrated reeler portion 304 of the preparation work station 210, a robot obtains an empty reelette 264 from a carrier 300. The robot moves the reelette 264 to the reeler 304, located at the output of the wire marker 214 just downstream of the cutter 318, to receive the wire segment 100. The reeler 304 includes a mounting plate 310 rotatably mounted on a shaft 308 (FIG. 17). The mounting face of the plate 310 has opposite projections 314 with slots 315 for receiving the opposite side edges of the back plate 266 of the reelette, as shown in FIGS. 18-22. The reeler 304 also includes a plurality of pins 302 mounted on a plate 312 that is axially slidable along the shaft 308. When the reelette 264 has been engaged in the slots 315, the pin plate 312 is moved to extend the pins 302 through the slots 280, 282 in the reelette 264 to define a pin hub. The pins 302 cooperate with the slots 315 to retain the reelette 264 on the mounting plate 310.

Figure 18:
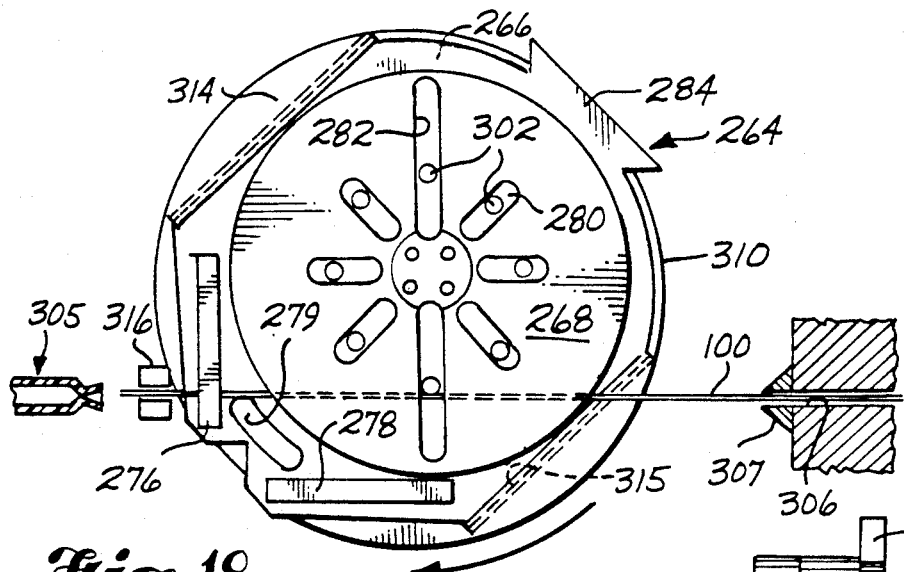
FIG. 18 is a front elevational view of the mechanism shown in FIG. 17 with a reelette mounted thereon, illustrating an initial stage of the reeling procedure.
Figure 19:
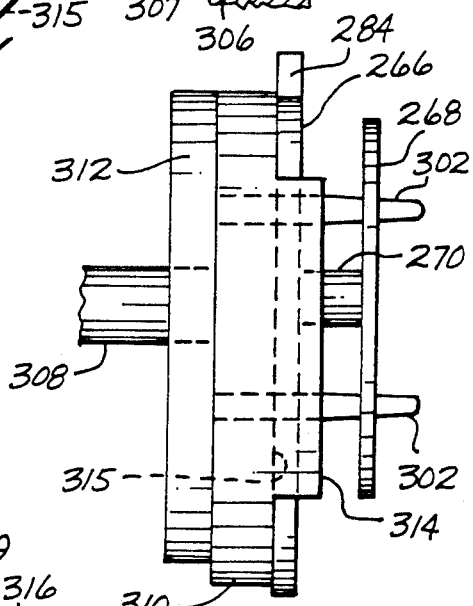
FIG. 19 is a simplified side elevational view of the mechanism and reelette shown in FIG. 18.
Figure 20:
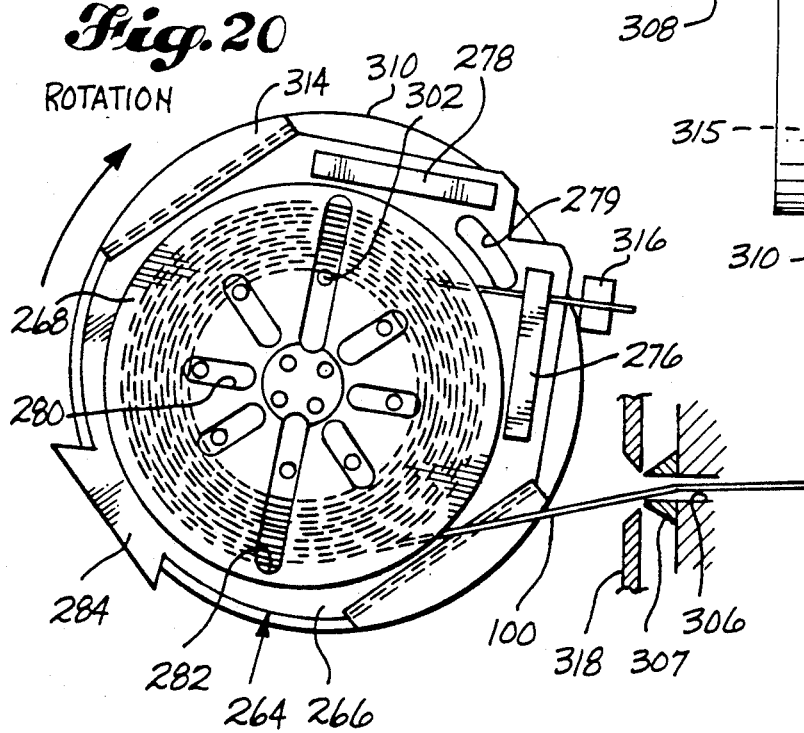
FIG. 20 is like FIG. 18 except that it shows the reeling procedure when the end of the wire segment has reached the cutter.

An exit hole 306 is formed in a housing portion of the marker 214. A nipple 307 is formed on the housing at the outer end of the hole 306. The reeler 304 includes an elongated seamless tube 305 with a smooth inner surface. In order to bring the leading end of a wire segment 100 into engagement with the reelette 264 mounted on the plate 310, the tube 305 is moved from the position shown in FIG. 18 to a position in which its end surrounds, and is opened by, the nipple 307. In this position, the tube 305 forms a tunnel for the leading end of the wire segment 100 from the marker 214 to a clamp 316 carried by the reeler mounting plate 310, and to the reelette clamp 276. The marker 214 projects the unsevered wire segment 100 out through the hole 306 and into the tube 305. Then, the tube 305 is retracted back toward the position shown in FIG. 18. When it is withdrawn from the nipple 307, the resilient end of the tube 305 closes until any end opening remaining is smaller than the cross section of the wire segment 100. The resiliency may be provided by the material from which the tube end is made or by the spring action of tines at the end of the tube 305. As the tube 305 moves away from the marker housing, the tube end grips the wire segment 100 and holds it taut and straight. The tube 305 brings the leading end of the segment 100 into alignment with the clamps 276, 316. While the leading end is being brought into alignment, the reelette clamp 276 is held open by a retractable pin (not shown) carried by the mounting plate 310 that pushes against the rear surface of the clamp 276. When the leading end has been aligned, the clamps 316, 276 are closed to secure the segment leading end in position. Then, the tube 305 is disengaged from the segment end, as shown in FIG. 18.

Figure 21:
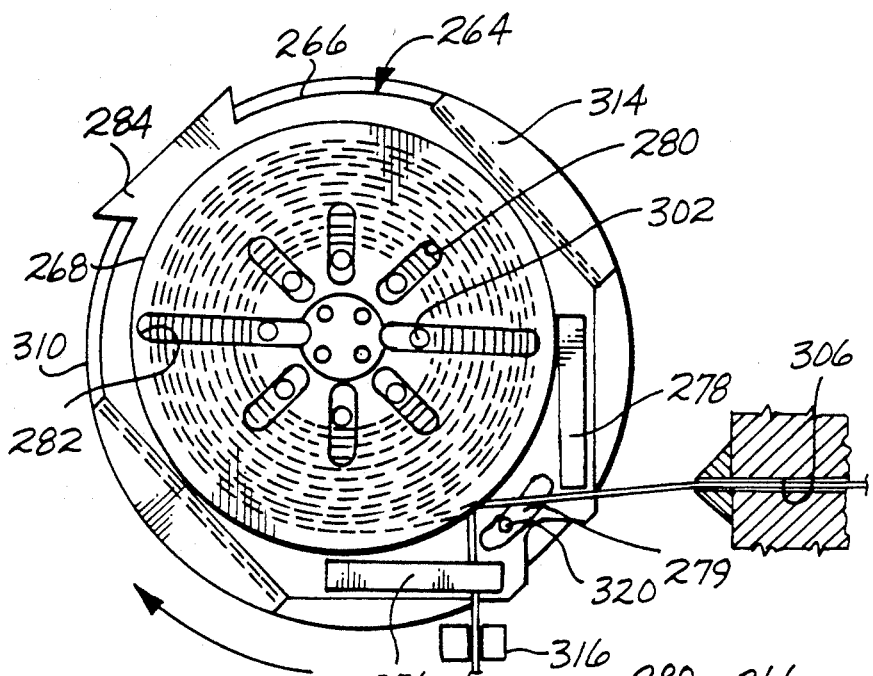
FIG. 21 is like FIGS. 18 and 20 except that it shows the pin hub released and the trailing end of the segment brought around to the trailing end clamp of the reelette.
Figure 22:
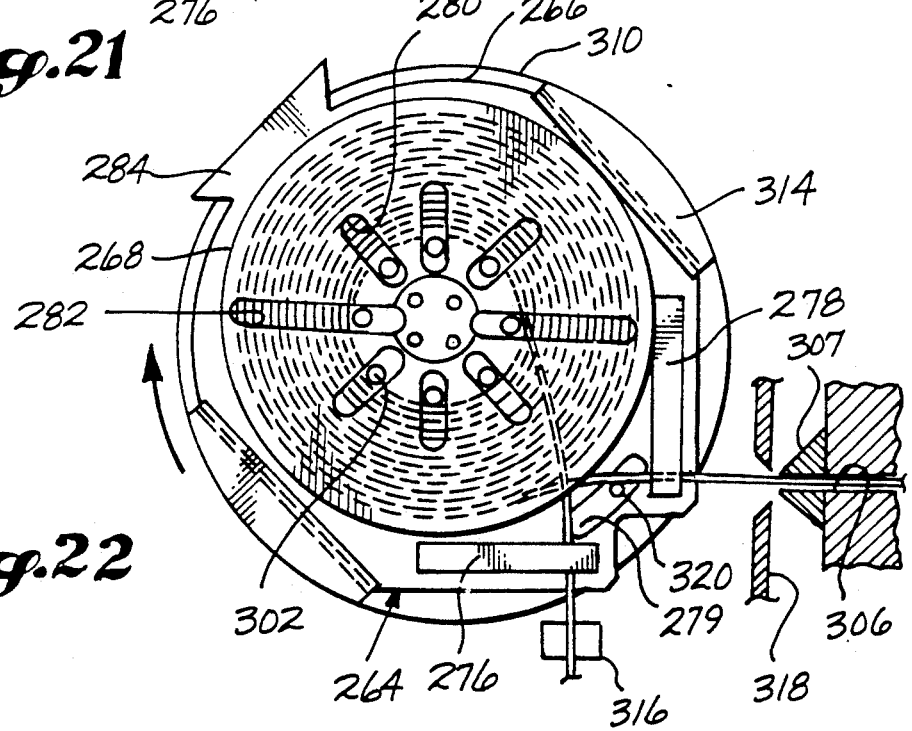
FIG. 22 is like FIG. 21 except that it shows the trailing end aligned with the clamp.

With the leading end secured by the clamps 276, 316, the shaft 308 is rotated to spool the segment 100 onto the reelette 264 as the segment 100 is being marked. The pin hub formed by the pins 302 defines the diameter of the coils of the segment 100 on the reelette 264. When the segment 100 has been fully spooled onto the reelette 264 and the trailing end cut point is aligned with the cutter 318 (FIG. 20), the trailing end must be brought into a position where it can be clamped by the second clamp 278 of the reelette 264. In order to accomplish this, the pins 302 are moved radially inwardly to allow the diameter of the final coil of the segment 100 to be made smaller as the mounting plate 310 continues to rotate to bring the clamp 278 around to the trailing end (FIG. 21). The pins 302 may be positively moved or may be pushed radially inwardly against a spring force by the tension on the segment 100. When the clamp 278 has reached the position shown in FIG. 21, the segment trailing end is moved into a clamping position by a guide pin 320. The pin 320 is mounted separately from the plate 310 and is projected into the guide slot 279 in the reelette back plate 266, as shown in FIG. 22. The plate 310 continues to rotate to move the pin 320 along the slot 279. Then, the reeler secures the trailing end in the reelette clamp 278. Finally, the cutter 318 severs the trailing end.

Figure 23:
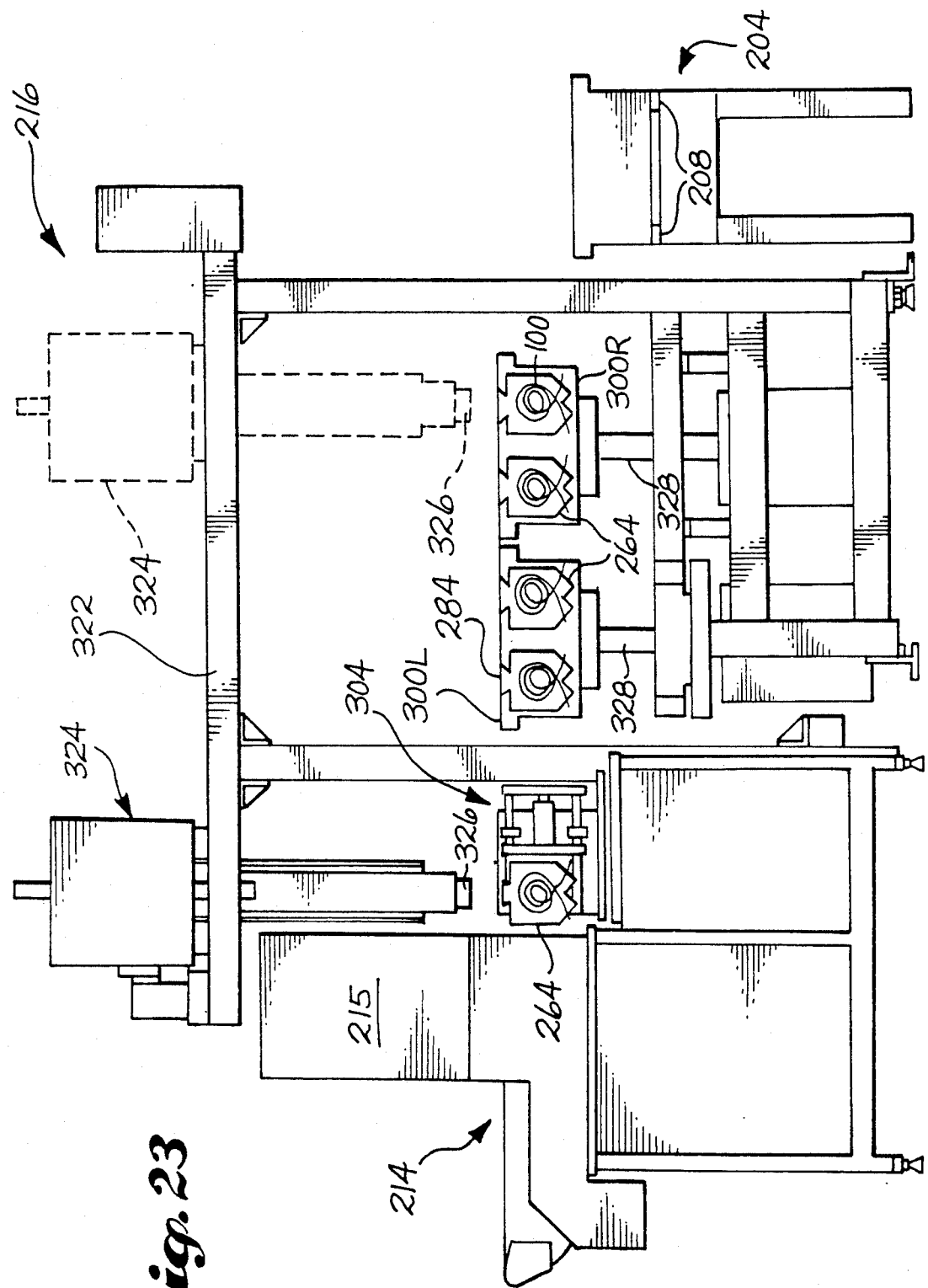
FIG. 23 is a side elevational view of a portion of the preparation subsystem shown in FIG. 14, including the loader.
Figure 24:
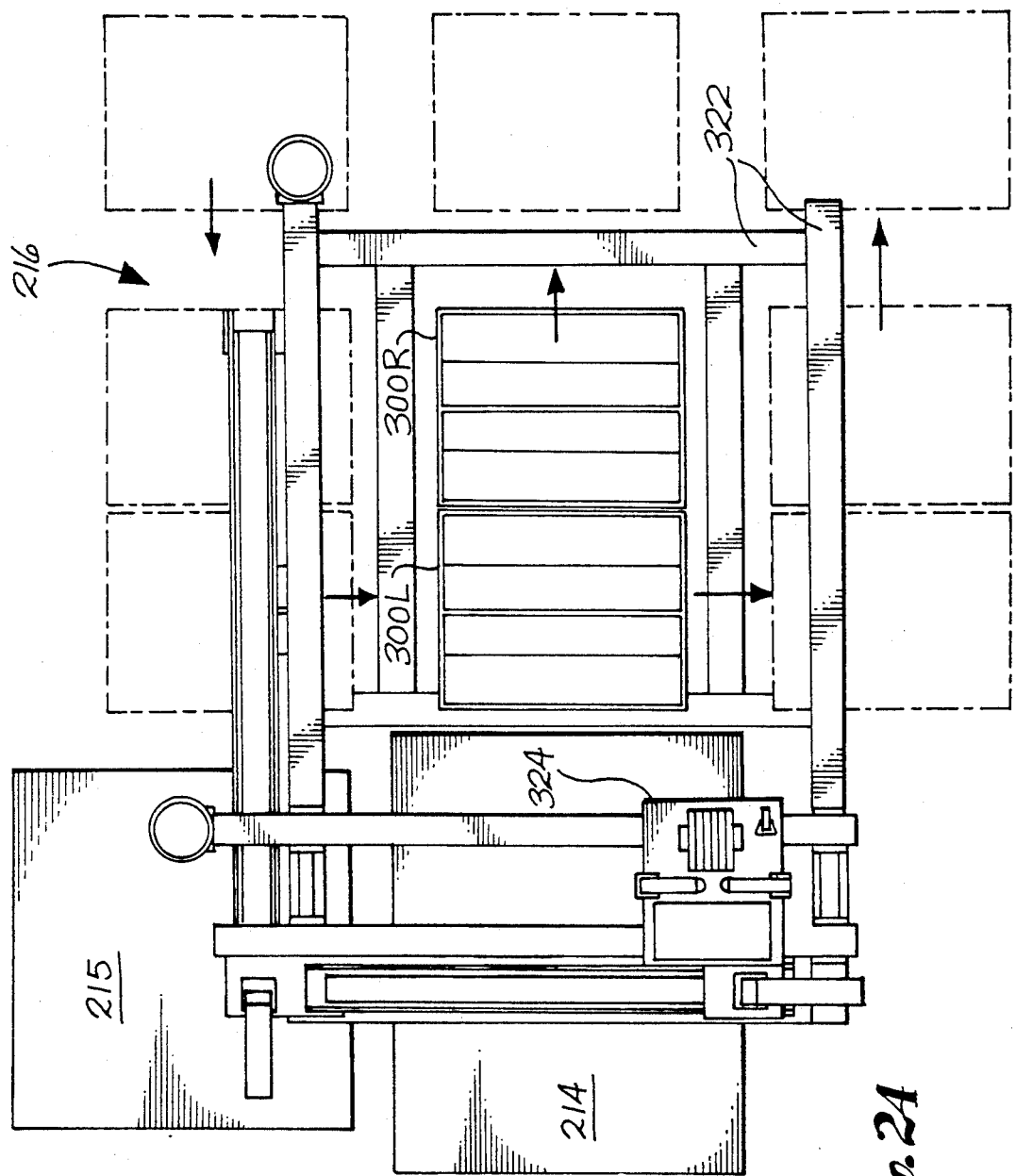
FIG. 24 is a plan view of the apparatus shown in FIG. 23.

Both the leading end and the trailing end of the segment 100 are secured in the reelette clamps 276, 278 with a fixed length end portion extending from the reelette 264 to ensure the accommodation of the segment ends in the carrier 300 and the accessibility of the segment ends to the processing equipment in the termination subsystem. The clamping of the trailing end completes the loading of the segment 100 onto the reelette 264. The loader robot then returns the filled reelette 264 to its assigned slot in the carrier 300. When a segment is to be aborted because of a detected splice or insulation damage, the robot deposits the reelette 264 into a separate reject carrier 300R (FIGS. 23 and 24).

In the procedure for reeling a wire segment 100 onto the reelette 264' shown in FIG. 16, the tunnel for the segment leading end is formed by the groove 262 and a plate that is moved into position to cover the groove 262. The entire reeler is moved to bring the tunnel into engagement with the marker exit hole. The segment leading end is fed into the tunnel and clamped by both reelette clamps 276', 278'. Then the reeler is moved back away from the marker for the reeling procedure. The segment trailing end is brought around to the reelette clamp 278' by retracting the pin hub, rather than moving the pins radially inwardly. Tension on the trailing end is maintained by resistance of the reelette cover 268' to the movement of the segment coils radially inward of the shoulder 274. In other respects, the procedure is similar to the above-described procedure for loading the reelette 264. In both cases, the pins of the pin hub are tapered and polished to prevent them from binding on the segment coils when they are retracted.

As shown in FIG. 15, the wire carrier loader 216 has its own independent local controller which operates under the direction of the system controller. Coordination of the operation of the loader 216 with the operation of the marker 214 and reeler 304 is provided by direct communication and physical interfaces between these elements and through the subsystem master controller, which is in communication with the three local controllers for the marker 214, reeler 304, and loader 216. Like the other elements of the preparation subsystem, the loader 216 operates automatically.

The loader 216 acquires a carrier with empty reelettes from the transport subsystem and positions the carrier for loading. The carrier being loaded is designated by the reference character 300L in FIGS. 23 and 24. The loader 216 includes a robot 324 mounted on a gantry 322 and having a work head 326 for gripping the top lugs 284 on the reelettes 264. The robot 324 acquires filled reelettes 264 from the reeler 304 and loads them in the appropriate positions in the carrier 300L or, in the case of reelettes 264 containing rejected segments, into a reject carrier 300R. The robot 324 also delivers empty reelettes to the reeler 304, as described above. The reject loading position of the robot 324 is shown in broken lines in FIG. 23. An empty reelette 264 is obtained from the carrier 300R to replace a reelette 264 with a rejected segment. When all of the wire segments assigned to the carrier 300L have been loaded therein, the loader returns the carrier 300L to the transport subsystem for transport to the termination subsystem.

As shown in FIGS. 14 and 24, the loader 216 includes six carrier positions, an input station with two carrier positions, a loading station, a reject loading station, and an output station with two carrier positions. Normally, at least one carrier is queued in the input station while the carriers 300L and 300R are being loaded in the loading stations. Movement of carriers into and out from the input station, loading stations, and output station is accomplished by the operation of a lateral transfer mechanism and a positioning conveyor 218. This mechanism and conveyor 218 may be of the same type as the corresponding elements 228, 236 described below in connection with the automated termination stations 220. Carrier lifts 328 (FIG. 23) raise the carrier 300L being loaded and the carrier 300R for rejects during the loading operation. When the reelettes 264 in the reject carrier 300R are all full, the carrier 300R may be transferred directly to the main conveyor 204, as indicated by the arrow in FIG. 24.

Termination Subsystem

Figure 25:
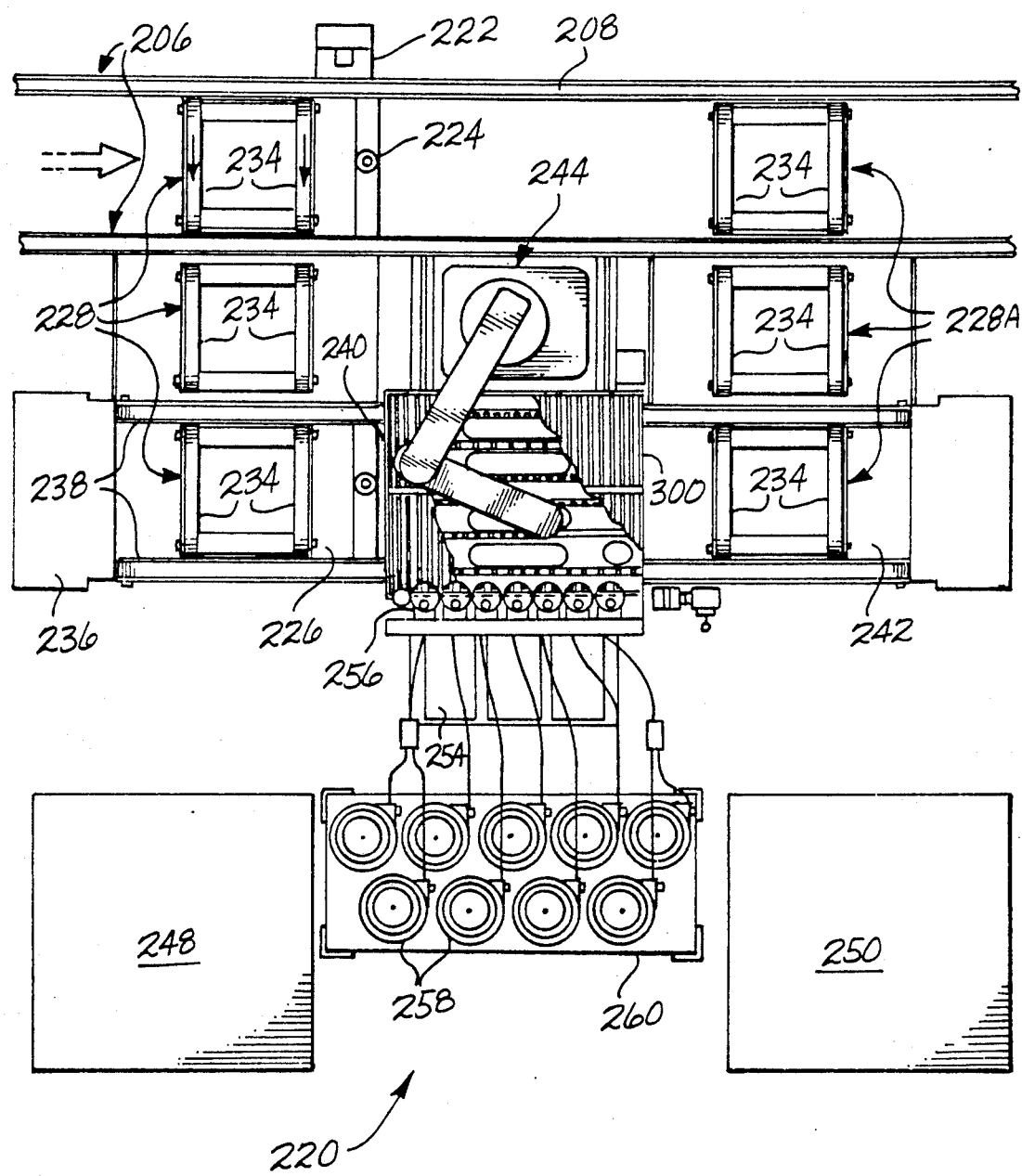
FIG. 25 is an enlarged plan view of one of the automated termination stations shown in FIG. 14.

Referring to FIGS. 14 and 25, each of the automated termination stations 220 in the termination subsystem has its own independent local controller 248 that operates under the direction of and is in communication with the system controller via a subsystem master controller The subsystem master controller is also linked to the local controller of the transport subsystem to coordinate the operation of the automated termination stations 220 and the transport subsystem. Each automated termination station 220 also has a vision controller 250 that controls the visual inspection of wire segments under the direction of the local controller 248.

The operation of each automated termination station 220 is automatic and normally does not require operator intervention. In the system illustrated in FIGS. 14–29, each of the automated termination stations 220 is substantially identical except that the end processing devices may accommodate different types of wire and/or end terminators (contacts, lugs, etc.). Each station 220 has the configuration shown in FIGS. 14 and 25. The structure and functioning of the station 220 is described in detail in the applicant's copending application entitled "Automated Termination Station and Method of Using Same". Such description is incorporated herein by reference. The description is summarized below.

Each station 220 is positioned along one side of the main conveyor 204. Carriers 300 move along the conveyor 204 in the forward direction indicated by the arrow in FIG. 14. A bar code reader 222 is mounted on the side of the conveyor 204 opposite the automated termination station 20. Each carrier 300 has a bar code printed on a forward side portion thereof. When the reader 222 detects a carrier 300 designated for processing at the station 220, a stop mechanism 224 is activated by the transport subsystem local controller to halt the forward movement of the carrier 300. The controller also temporarily deactivates the portion of the main conveyor 204 on which the carrier 300 is located The conveyor 204 has short gaps to make this possible. The carrier 300 is stopped in the position indicated by the rectangle 230 in FIG. 14. After the carrier 300 and conveyor section have been stopped, the carrier 300 is moved laterally off the conveyor 204 into the input depot 226 of the station 220 by a lateral transfer mechanism.

The lateral transfer mechanism includes three short aligned conveyors 228 One of the conveyors 228 is mounted between the two endless belts 208 of the main conveyor 204 and is provided with a raising mechanism to raise the two belts 234 of the conveyor 228 to a height at least as high as the belts 208 of the main conveyor 204 and into engagement with the bottom of the carrier 300. The lateral conveyor 228 that is located in the station 220 adjacent to the main conveyor 204 has a fixed height. The other conveyor 228 in the station 220 has a raising mechanism and is raised and lowered with the conveyor 228 mounted between the belts 208 of the main conveyor 204 in order to clear the belts 238 of an inner positioning conveyor 236. The three lateral conveyors 228 are activated to move the carrier 300 laterally into the input station 226. A suitable stop (not shown) is provided to limit lateral movement of the carrier 300.

The positioning conveyor 236 is parallel to the main conveyor 204 and is operated to move carriers 300 from the input station 226 into the work depot 240, and from the work depot 240 into the output station 242. Suitable stops (not shown) are provided to prevent overtravel of a carrier 300 being moved into the work depot 240 or output station 242. Preferably, the stops precisely locate the carrier 300 so that the termination station robot 244 can accurately locate individual wire segments 100. The station 220 could, instead, be provided with a vision device for accurately determining the carrier position.

The termination station 220 has a second lateral transfer mechanism including three lateral conveyors 228A with essentially the same structure as the conveyors 228. The conveyors 228A are operated to shift a carrier 300 laterally out of the output station 242 back onto the main conveyor 204. The carrier 300 may be transferred out of the termination station 220 as soon as it has been moved into the output station 242. Alternatively, it may be retained in the output station 242 until a more convenient time, such as when the traffic on the main conveyor 204 is lighter or when the next termination station 220 is ready for the carrier 300. The timing is determined by the transport subsystem controller under the direction of the system controller.

The automated termination station 220 includes a robot 244 with a work envelope The work depot 240 and a plurality of wire segment end processing devices are positioned within the work envelope. The robot 244, the four lateral conveyors 228, 228A in the station 220, and the wire segment end processing devices are mounted on a movable support frame to give the station 220 a modular construction and facilitate maintenance and reconfiguration, as described in the applicant's copending application entitled "Automated Termination Station and Method of Using Same". The end processing devices include wire strippers 254 and crimpers 256. Vibrator bowls 258 for feeding contacts to the crimpers 256 are mounted on a separate isolated table 260. The local controller 248 and the vision controller 250 are positioned on opposite sides of the isolated table 260.

An important feature of the invention that is present in both embodiments is the capacity of the system for asynchronous flow of the wire segments therethrough and for adjusting to changing conditions. In each system, when manufacturing under a job order is initiated, a sequence for the flow of segments through the system is determined. This sequence includes the station or stations in each of the preparation and termination subsystems each carrier will be processed at and the sequence of the delivery of the carrier to the designated stations. As the manufacturing process proceeds, the system controller receives status reports from the subsystems. If there has been a change in conditions that could affect the efficiency of the sequence of operation, such as a failure in one of the work stations of the preparation or termination subsystem, the controller revises the sequence of operation for the carriers being processed, as necessary, to maintain maximum efficiency and avoid delays.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A system for manufacturing electrical wire harnesses, comprising:
   an information storage subsystem for storing computer process control data;
   a wire segment preparation subsystem for preparing batches of wire segments of predetermined lengths;
   a termination subsystem including a plurality of autonomous wire segment termination stations;
   a communication subsystem to transfer said control data in batches to said segment preparation subsystem and said termination stations; and
   a wire segment transport subsystem for selectively transporting batches of wire segments from said segment preparation subsystem to said termination stations.

2. The system of claim 1, in which said termination stations include at least one manual station and at least one automated station.

3. The system of claim 1, in which said information storage subsystem accepts engineering harness data and converts it to computer process control data.

4. The system of claim 1, in which said segment preparation subsystem includes devices to measure and cut wire from a continuous source into segments of predetermined lengths.

5. The system of claim 4, in which said segment preparation subsystem further includes apparatus for marking said segments.

6. The system of claim 5, in which said segment transport subsystem includes a plurality of carriers, each said carrier being dimensioned to receive a batch of wire segments.

7. The system of claim 4, in which said segment transport subsystem includes a plurality of carriers, each said carrier being dimensioned to receive a batch of wire segments.

8. The system of claim 7, in which each said carrier is dimensioned to receive a plurality of reels, each said reel being adapted to receive a single wire segment wound thereon.

9. The system of claim 7, in which said transport subsystem further includes an endless-belt type conveyor for transporting said carriers from said segment preparation subsystem to said termination stations.

10. The system of claim 1, in which said transport subsystem includes a plurality of carriers, each dimensioned to receive a batch of wire segments.

11. The system of claim 10, in which said transport subsystem further includes an endless-belt type conveyor for transporting said carriers from said preparation subsystem to said termination stations.

12. The system of claim 10, in which said termination stations include at least one automated termination station.

13. The system of claim 12, in which said automated termination station includes queuing substations for incoming and outgoing carriers.

14. The system of claim 13, in which said transport subsystem further includes an endless-belt type conveyor for transporting said carriers from said preparation subsystem to said termination stations; and said queuing substations are accessible to but independent of said conveyor.

15. The system of claim 1, in which said communication subsystem includes a shop supervisor that receives status reports from said termination stations and makes data requests to said information storage subsystem.

16. A method of manufacturing electrical wire harnesses, comprising:
providing a wire segment preparation subsystem and a plurality of termination stations;
communicating computer process control data in batches to said preparation subsystem and said termination stations;
in said preparation subsystem, using said control data to independently control preparation of a batch of wire segments;
selectively transporting said batch of wire segments to one of said termination stations; and
at said one station, using a batch of said control data to independently control processing of end portions of said wire segments.

17. The method of claim 16, in which the step of preparing a batch of wire segments includes measuring wire from a continuous source and cutting it into predetermined lengths.

18. The method of claim 17, in which the step of preparing a batch of wire segments further includes marking the segments.

19. The method of claim 18, comprising loading the batch of segments prepared in said segment preparation subsystem into a carrier for transport to said termination stations.

20. The method claim 17, comprising loading the batch of segments prepared in said segment preparation subsystem into a carrier for transport to said termination stations.

21. The method of claim 20, in which the step of transporting said batch of wire segments to said termination stations comprises placing said carrier on an endless-belt type conveyor.

22. The method of claim 16, comprising loading the batch of segments prepared in said segment preparation subsystem into a carrier for transport to said termination stations.

23. The method of claim 22, in which the step of transporting said batch of wire segments to said termination stations comprises placing said carrier on an endless-belt type conveyor.

24. The method of claim 22, comprising queuing carriers in at least one of said termination stations.

25. The method of claim 16, further comprising transporting batches of wire segments from said termination stations to a lay-up subsystem.

26. The method of claim 25, comprising communicating control data in batches to said lay-up subsystem.

27. The method of claim 16, comprising generating said computer process control data from engineering harness data.

28. The method of claim 16, comprising transporting said batch of segments to a plurality of said termination stations; determining an initial order in which said batch of segments is to be transported to said termination stations; and monitoring said termination stations to determine if said initial order needs to be revised to maintain efficiency.

29. The method of claim 28, in which said preparation subsystem has a plurality of work stations; and which comprises making an initial determination as to at how many of said work stations, and in what sequence of said work stations, said batch of segments is to be prepared, and monitoring said preparation subsystem to determine if said initial determination needs to be revised to maintain efficiency.

30. The method of claim 16, in which said preparation subsystem has a plurality of work stations; and which comprises making an initial determination as to at how many of said work stations, and in what sequence of said work stations, said batch of segments is to be prepared, and monitoring said preparation subsystem to determine if said initial determination needs to be revised to maintain efficiency.

* * * * *

UNITED STATES PATENT AND TRADEMARK OFFICE
CERTIFICATE OF CORRECTION

PATENT NO. : 5,153,839

DATED : October 6, 1992

INVENTOR(S) : Dan A. Cross

It is certified that error appears in the above-identified patent and that said Letters Patent is hereby corrected as shown below:

Col. 1, line 60, "Blooh" should be -- Bloch --.
Col. 1, line 62, after "4,803,778," insert -- granted February 14, 1989, to the present inventor. In the --.
Col. 1, line 64, delete the period after "swivels".
Col. 2, line 14, delete the comma after "stages".
Col. 3, lines 4 and 5, "segments," should be -- segments. --.
Col. 3, line 8, there is a period after "operator".
Col. 3, line 11, ".manually" should be -- manually --.
Col. 4, line 59, "terminations" should be -- termination stations --.
Col. 6, lines 33 and 38, "form board" is one word.
Col. 7, line 29, delete the hyphen after "personal".
Col. 8, line 43, delete the hyphen after "reliability".
Col. 9, line 37, "outs" should be -- cuts --.
Col. 9, line 56, delete the hyphen after "in".
Col. 11, line 22, "top the" should be -- to the --.
Col. 11, lines 24 and 25, "thecarrier" should be -- the carrier --.
Col. 11, line 28, "terminatin" should be -- termination --.
Col. 11, line 32, "stations 208, 110" should be -- stations 108, 110 --.
Col. 12, line 5, "108, 110 12" should be -- 108, 110, 112 --.
Col. 12, line 25, there is a period after "stations".
Col. 12, line 59, "station 142," should be -- station 142' --.
Col. 13, lines 4 and 5, there is a period after "assembly".

UNITED STATES PATENT AND TRADEMARK OFFICE
CERTIFICATE OF CORRECTION

PATENT NO.  : 5,153,839
DATED       : October 6, 1992
INVENTOR(S) : Dan A. Cross It is certified that error appears in the above-identified patent and that said Letters Patent is hereby corrected as shown below:

Col. 13, line 33, there is a period after "subsystem".
Col. 13, line 40, "hooks" should be -- docks --.
Col. 13, line 42, there is a period after "drawings".
Col. 13, line 43, there is a period after "harness".
Col. 14, line 2, "cart 70" should be -- cart 170 --.
Col. 16, line 3, there is a period after "floor".
Col. 16, line 41, there is a period after "bundles".
Col. 16, line 43, there is a period after "carrier 300".
Col. 17, line 17, there is a period after "loaded".
Col. 17, lines 23-24, change ".received" to -- received --.
Col. 17, line 59, there is a period after "positions".
Col. 18, line 13, there is a period after "system".
Col. 18, line 67, there is a period after "controller".
Col. 19, line 28, "marker" should be -- marker's --.
Col. 19, line 35, "2i4" should be -- 214 --.
Col. 20, line 16, there is a period after "carrier 300".
Col. 20, line 28, "plate 266," should be -- plate 266' --.
Col. 20, line 60, "slots 282," should be -- slots 282' --.
Col. 21, line 11, "90 orientation" should be -- 90° orientation. --.
Col. 21, line 12, "266,," should be -- 266''. --.
Col. 21, line 22, there is a period after "below".
Col. 21, line 34, there is a period after "edges".
Col. 21, line 38, there is a period after "therefrom".

UNITED STATES PATENT AND TRADEMARK OFFICE
CERTIFICATE OF CORRECTION

PATENT NO. : 5,153,839
DATED : October 6, 1992
INVENTOR(S) : Dan A. Cross

It is certified that error appears in the above-identified patent and that said Letters Patent is hereby corrected as shown below:

Col. 21, line 42, "reelette 264'," should be -- reelette 264'' --.
Col. 21, line 62, "carrier 300'," should be -- carrier 300'' --.
Col. 24, line 29, there is a period after "controller", second occurrence.
Col. 24, line 56, "station 20" should be -- station 220 --.
Col. 24, line 63, there is a period after "located".
Col. 25, line 4, there is a period after "conveyors 228", first occurrence.
Col. 25, line 47, there is a period after "envelope".

Signed and Sealed this

Twenty-second Day of February, 1994

Attest:

BRUCE LEHMAN

Attesting Officer          Commissioner of Patents and Trademarks